(12) United States Patent
Baurmeister et al.

(10) Patent No.: US 6,544,423 B1
(45) Date of Patent: Apr. 8, 2003

(54) MEMBRANE MODULE FOR SUBSTANCE-SPECIFIC FLUID TREATMENT

(75) Inventors: Ulrich Baurmeister, Wuppertal (DE); Rudolf Wollbeck, Erlenbach (DE)

(73) Assignee: Mat Absorption Technologies GmbH & Co. KG, Wuppertal (DE)

( * ) Notice: Subject to any disclaimer, the term of this patent is extended or adjusted under 35 U.S.C. 154(b) by 0 days.

(21) Appl. No.: 09/297,559

(22) PCT Filed: Oct. 27, 1997

(86) PCT No.: PCT/EP97/05927
§ 371 (c)(1),
(2), (4) Date: Jun. 25, 1999

(87) PCT Pub. No.: WO98/19777
PCT Pub. Date: May 14, 1998

(30) Foreign Application Priority Data

Nov. 6, 1996  (DE) ......................................... 196 45 738

(51) Int. Cl.[7] .............................................. B01D 63/04
(52) U.S. Cl. ...................... 210/650; 210/651; 210/805; 210/321.84; 210/321.85; 210/321.89
(58) Field of Search ........................ 210/198.2, 321.72, 210/321.74, 321.75, 321.76, 321.79, 321.8, 321.83, 321.84, 321.85, 321.89, 302.1, 510.1, 651, 656, 500.23, 650, 805; 436/531, 532, 535; 530/810, 812, 815, 816, 817

(56) References Cited

U.S. PATENT DOCUMENTS

| | | | |
|---|---|---|---|
| 4,061,141 A | | 12/1977 | Hyden et al. |
| 4,266,026 A | | 5/1981 | Breslau |
| 4,935,142 A | | 6/1990 | Sternberg |
| 5,019,270 A | | 5/1991 | Afeyan et al. |
| 5,114,581 A | * | 5/1992 | Goldsmith et al. |
| 5,693,230 A | * | 12/1997 | Asher |
| 5,711,882 A | * | 1/1998 | Hofmann et al. |

FOREIGN PATENT DOCUMENTS

| | | |
|---|---|---|
| DE | 28 42 835 A | 4/1980 |
| DE | 29 26 434 A1 | 6/1980 |
| DE | 33 02 384 | 7/1984 |

(List continued on next page.)

OTHER PUBLICATIONS

Klein, Elias, Affinity Membranes: Their Chemistry and Performance in Adsorptive Separation Processes, John Wiley & Sons, Inc., New York, 1991, pp. 151–152.

(List continued on next page.)

Primary Examiner—John Kim
Assistant Examiner—David Sorkin
(74) Attorney, Agent, or Firm—Oliff & Berridge, PLC

(57) ABSTRACT

An apparatus and process for substance-specific treatment of fluids using groups of first and second treatment elements, adjacently positioned in a housing and made from membranes, the treatment elements having cavities open on one side, whereby the cavities of the first treatment elements are open in the direction of the inlet arrangement of the housing and the cavities of the second treatment elements are open in the direction of its outlet arrangement. A stream of the fluid to be treated is introduced via the inlet arrangement into a distribution space, which is delimited only by the housing, the inlet arrangement, and the ends, pointing to the inlet arrangement of the treatment element group adjacent to the inlet arrangement, and entering the cavities of the first treatment elements. The stream then flows successively through the walls of the first and second treatment elements, whereby the substance-specific treatment of the fluid takes place. The treated fluid exits from the cavities of the second treatment elements into a collection space, which is delimited only by the housing, the outlet arrangement, and the ends, pointing toward the outlet arrangement of the treatment element group adjacent to the outlet arrangement, and removed from the housing via the outlet arrangement.

49 Claims, 9 Drawing Sheets

FOREIGN PATENT DOCUMENTS

| | | |
|---|---|---|
| DE | 39 23 128 A1 | 1/1991 |
| DE | 195 01 726 A1 | 7/1996 |
| EP | 0 173 500 A1 | 3/1986 |
| EP | 0 283 826 A2 | 9/1988 |
| EP | 0 341 413 A2 | 11/1989 |
| EP | 0 521 495 A2 | 1/1993 |
| EP | 0 565 978 A1 | 10/1993 |
| EP | 0 610 755 A1 | 8/1994 |
| EP | 0 490 940 B1 | 5/1995 |
| GB | 1 221 994 | 2/1971 |
| WO | WO 90/04609 | 5/1990 |
| WO | WO 90/05018 | 5/1990 |
| WO | WO 91/03506 | 3/1991 |

OTHER PUBLICATIONS

Brandt, Steve et al., "Membrane–Based Affinity Technology for Commercial Scale Purifications," Bio/Technology, vol. 6, Jul. 1988, pp. 779–782.

Sakai, K., "Determination of Pore Size and Pore Size Distribution 2. Dialysis Membranes," Journal of Membrane Science, 1994, pp. 91–130.

Nakao, Shin–ichi, "Determination of Pore Size and Pore Size Distribution 3. Filtration Membranes," Journal of Membrane Science, 1994, pp. 131–165..

Zeman, Leos et al., "Characterization of Microfiltration Membranes by Image Analysis of Electron Micrographs. Part I. Method Development," Journal of Membrane Science, vol. 71, 1992, pp. 221–231.

Kaneko, Katsumi, "Determination of Pore Size and Pore Size Distribution 1. Adsorbents and Catalysts," Journal of Membrane Science, 1994, pp. 59–89..

Muller, Werner, "New Ion Exchangers for the Chromatography of Biopolymers," Journal of Chromatography, vol. 510, 1990, pp. 133–140.

Tsuneda, Satoshi et al., "Binding of Lysozyme onto a Cation–Exchange Microporous Membrane Containing Tentacle–Type Grafted Polymer Branches," Biotechnol. Prog. vol. 10, 1994, pp. 76–81.

Tsuneda, Satoshi et al., "High–Throughput Processing of Proteins Using a Porous and Tentacle Anion–Exchange Membrane," Journal of Chromatography A, vol. 689, 1995, pp. 211–218.

Vetter, Dr. Hellmuth et al., "Band 10: Enzyme," pp. 475–561.

Seidel, D., "The Help System: An Efficient and Safe Method of Plasmatherapy in the Treatment of Severe Hypercholesterolemia," Therapeutische Umschau, Band 47, 1990, pp. 514–519.

* cited by examiner

MEMBRANE MODULE FOR SUBSTANCE-SPECIFIC FLUID TREATMENT

BACKGROUND OF INVENTION

The invention relates to an apparatus for substance-specific treatment of a fluid, including a) a housing, b) an inlet arrangement for introducing the fluid to be treated into a distribution space in the housing, c) an outlet arrangement for removing the treated fluid from a collection space in the housing, d) at least one first treatment element and at least one second treatment element for substance-specific treatment of the fluid, where each treatment element has an end pointing toward the inlet arrangement and an end pointing to ward the outlet arrangement, whereby the at least one first treatment element has at least one cavity formed by its walls, open toward the inlet arrangement and closed toward the outlet arrangement, and the at least one second treatment element has at least one cavity formed by its walls, open toward the outlet arrangement and closed toward the inlet arrangement; a process for substance-specific treatment of a fluid; and use of the apparatus.

Fluids in the context of the present invention are understood to be gases, gas mixtures, gases containing particles, and generally liquids such as clear solutions or suspensions.

Substance-specific treatments of fluids are becoming increasingly significant for applications such as biotechnology, medicine, or chemical technology. An example is the extraction of active agents from cell suspensions in which genetically modified cells have generated substances such as antibodies, hormones, growth factors, or enzymes, usually in small concentrations. Other important applications are the extracorporeal removal of undesired substances from human blood plasma and extraction of components such as immunoglobulins or clotting factors from the plasma of donated blood. Finally, another broad application area is the catalytic or biocatalytic—enzymatic—treatment of fluids, such as the hydrolysis of oils by lipases immobilized in a matrix.

The substance-specific treatment of fluids is frequently conducted such that the fluid to be treated is brought into contact with a carrier material, on and/or in which interacting groups or substances are immobilized that, in a specific, selective manner, interact with the target substance contained in the fluid, i.e., with the substance that is the object of the substance-specific treatment. Such interactions can be, for example, cationic or anionic exchange, hydrophilic/hydrophobic interaction, hydrogen bridge formation, affinity, or enzymatic or catalytic reactions, and the like. In affinity separation of substances, ligands are coupled to or immobilized in the carrier material and have the function of adsorptively binding a specific single target substance or an entire class of substances.

This target substance is termed a ligate. One example of classs-pecific ligands are positively charged diethylaminoethyl (DEAE) groups or negatively charged sulfonic acid ($SO_3$) groups, which adsorb the class of positively charged or negatively charged molecules, respectively. Specific ligands are, for example, antibodies against a certain protein, which is bound as a ligate to the antibody.

Substance-specific treatments in the context of the present invention are also understood to be those treatments via which molecules or particles are separated or retained due to their size. For a number of applications, it is desirable or necessary to subject a fluid to be treated to several, possibly different substance-specific treatments. In the case of filtration processes of suspensions with differing particle fractions, it is practical to first prefilter larger particles with a coarse, open-pored prefilter and then to subject the filtrate to further substance-specific treatment, according to size or to affinity for a ligand, for example.

In so-called "downstream processing", such as further processing of biotechnically generated substances like proteins or biomolecules, several process stages for substance separation are conducted in series in order to isolate with optimum efficiency a certain target substance, such as an enzyme, from a prefiltered cell suspension. In this case, virus filtration stages are also employed in series with chromatographic stages. In other separation methods, anionic adsorbers are used sequentially with cationic adsorbers, or ionic adsorbers sequentially with hydrophobic adsorbers. Frequently, certain sizes of particle-shaped components, such as of a precipitate, must be retained from a suspension to be treated before the target substance is obtained in at least one chromatographic separation stage.

The major criteria in the substance-specific treatment of fluids are productivity and selectivity. With a view toward productivity, it is important that, per unit of volume, as many groups as possible are available that act in a substance-specific manner and can interact with the target substance contained in the fluid to be treated. At the same time, it is desirable to maximize the transport of the target substance to the groups or substances acting in a substance-specific manner.

One carrier material for ligands that is frequently employed in affinity chromatography is sepharose particles, which are present in bulk form in a chromatographic column. Even if a high concentration of ligands, with high selectivity, can be realized in this case, the productivity is known to be low due to the compressibility of the sepharose particles. Furthermore, the access of the ligates to the ligands contained in the sepharose particles is diffusion controlled, which results in long residence times and thus low throughput and productivity, in particular when separating larger molecules such as proteins, due to their low diffusion rates. Improved chromatographic column materials are described in U.S. Pat. No. 5,019,270. These consist of rigid, porous particles through which convective flow is possible. As a result of the convective substance transport through the particles and the non-compressibility, reduced residence times and increased productivity are possible compared to the previously mentioned column material.

While it is an advantage of chromatographic columns filled with such particles that their construction and use are simple, they have a number of disadvantages, one of which, aside from those discussed for sepharose particles, is that in many cases the flow through the bulk particle material is not uniform, having a negative effect with respect to the uniform use of all the ligands present in the chromatographic column. Making the flow between the particles more uniform could probably be achieved by using spherical particles with as uniform a diameter as possible, but the production of such uniform particles is complex.

The cited disadvantages of particle-based carrier materials led to the development of a number of methods for substance-specific treatment of fluids, in which membranes with a porous structure are used as carrier materials for interacting groups. Due to their porous structure, membranes present a large inner surface area, so that a high number of functional groups can be coupled to the membrane, in high concentration per volume unit, which can interact with the fluids to be treated passing through the membrane (see, for example, E. Klein, "Affinity Membranes", John Wiley & Sons, Inc., 1991; S. Brandt et al., "Membrane-Based Affinity Technology for Commercial Scale Purifications", Bio/Technology Vol. 6 (1988), pp. 779–782).

Adaptation to the requirements of the treatment method can be attained via the type of the membrane used. Membranes are available in the form of hollow fibers or as flat membranes made from a wide variety of materials, so that adaptation to the physico-chemical properties of the fluids to be treated is possible. In addition, the pore size of the membranes can be adjusted such that a fluid to be treated, containing a target substance, for example, can pass through the membrane convectively, and—in the case of binding of the target substance to the interacting groups—there is no blockage of the membrane.

For a given linear flow rate, the thickness of the membrane wall can influence the residence time of the fluid to be treated and the pressure drop during flow. Due to the generally thin walls (<300 μm, for example), membranes are distinguished by short transport distances of the fluid to be treated to interacting groups, resulting in relatively short residence times, low pressure drops, high linear flow rates, and thus high binding rates. At the same time, the substantially uniform thickness of the membrane wall leads, for an appropriate flow towards the membrane, to a uniform flow through the carrier material and thus to a relatively narrow residence time distribution and to uniform and complete "utilization" of the interacting groups.

A number of apparatus containing such membranes have been described that are used in processes for substance-specific treatment of fluids and in which both flat membranes and hollow-fiber membranes are employed. In this case, a distinction must be drawn between so-called dead-end filtration or dead-end modules and cross-flow filtration or cross-flow modules.

In dead-end filtration, the entire fluid entering the membrane module as a feed stream is directed through the membrane and removed from the other side of the membrane as a filtrate or permeate.

In the cross-flow mode, the feed stream flows parallel to one side of the membrane. In this process, a portion of the feed stream flows through the membrane. The portion of the feed stream penetrating the membrane is removed as a permeate and the portion remaining on the feed-stream side as a retentate. In this case, an additional fluid stream can be directed to the permeate side of the membrane to take up the partial stream flowing through the membrane.

WO 90/05018 discloses a membrane module for use in affinity separation processes and corresponding in its construction to a cross-flow module. A ligate-containing liquid is directed into the module housing via an inlet arrangement and flows tangentially over one side of a hollow-fiber membrane, for example, to which ligands have been coupled. A portion of the fluid enters the membrane and flows through it, whereby the ligates are deposited on the ligands, and exits as a permeate stream on the side of the membrane opposite the inlet side. The retentate and permeate streams are removed via separate outlet arrangements.

In EP-A-0 341 413, an adsorber module is described for treatment of whole blood, in which the hollow-fiber membranes contained in the module and provided with ligands are subjected to blood flow through the lumen in cross-flow mode. Plasma enters the outer space enclosing the hollow-fiber membranes as a permeate through the hollow-fiber membrane wall, whereby the treatment of the plasma takes place in the membrane wall.

In a specific embodiment, this module has no outlet for the permeate. Rather, in the treatment of whole blood the plasma separated as a permeate accumulates in the outer space surrounding the capillaries and, due to the developing pressure conditions, re-enters the lumen through the hollow-fiber membrane wall. Such a module concept, however, has the disadvantage that only limited influence can be exerted on the plasma stream passing through the membrane, i.e., the fluid stream to be treated. Furthermore, the required treatment times are relatively long, since more than 10 minutes of permeate time are needed just for filling the outer space surrounding the hollow-fiber membranes.

The described modules operating in cross-flow mode for substance-specific treatment of fluids exhibit various disadvantages, such as the requirement for additional pumps and/or monitoring elements due to the separate permeate and retentate streams.

In U.S. Pat. No. 4,935,142, an apparatus containing a stack of flat membranes is described for conducting an affinity separation process in dead-end mode. Coupled to the flat membranes are ligands to which the ligates to be separated from the fluid to be treated are bound. The number of flat-membrane layers comprising the stack and thus the membrane surface area depend on the required capacity of the apparatus and its permissible pressure drop. The flat membranes constituting the membrane stack must be sealed off from the surrounding housing in order to force flow through the membrane stack. Such a construction is unfavorable from the standpoint of scaling-up, since providing a sufficiently large membrane surface area of the stack requires a large number of flat membranes, resulting in a high pressure drop during flow through the stack. Increasing the diameter of the flat membrane layers, however, requires additional measures to be taken to ensure uniform distribution across the membrane layers and provide the flat-membrane elements and the housing with sufficient stability with respect to the resulting pressure.

In EP-A-0 173 500, devices are also described for use in membrane-based affinity separation methods such as isolation of immunoglobulins, antibodies, etc. These devices or membrane modules contain microporous flat membranes folded in a star-shape. The flat membranes folded in a star-shape are supported between two coarse meshes and positioned between two coaxially arranged cylinder-shaped housing elements. According to EP-A-0 610 755, with the same construction of the devices as described in EP-A-0 173 500, a plurality of flat membranes folded in a star-shape are arranged concentrically to each other in the housing in order to increase the membrane surface area, make the flow more uniform, and prevent the target substances from breaking through.

In the cited devices, the fluid to be treated is fed through the module by applying pressure from the inside to the outside, or vice-versa, and flows through the membrane in dead-end mode. Compared to modules with unfolded, concentrically arranged membranes, the cited modules offer the advantage of relatively larger membrane surface area with comparatively lower pressure loss. However, generally only low filling ratios, defined as the ratio of membrane volume to the total module volume, are possible. DE-A-33 02 384 describes a dead-end module for plasma treatment containing hollow-fiber membranes, the module having two fractionating hollow-fiber-membrane bundles, connected in series, for separation of pathological plasma molecules. The ends of the hollow-fiber membranes of the two membrane bundles are embedded together in the module housing such that the hollow-fiber membranes of the first membrane bundle are open at their ends toward the module inlet and closed at their other ends, while the hollow-fiber membranes of the second membrane bundle are open at their ends toward the module outlet and closed at their other ends. The open ends of the two hollow-fiber bundles are therefore arranged oppositely. During operation, the blood plasma to be treated from which the pathogenic components are to be filtered flows in dead-end mode initially via the open ends of the hollow-fiber membranes of the first membrane bundle into the lumen of these membranes and through their walls into the extraluminal region. Once filtered in this manner, the plasma then flows from the outside to the inside into the lumen of the hollow-fiber membranes of the second membrane bundle and leaves them through their open ends.

Many dead-end and cross-flow modules have the common disadvantage that the production of the membrane modules for particular applications is complex, since embedding the membranes in the housing is always required. This is of particular disadvantage if the treatment process requires connecting several modules in series, for example. Embedding is also a particular drawback if aggressive solvents such as toluene are used for coupling or polymerization of ligands and this coupling takes place in the apparatus. In practice, the solvent-resistant embedding required in this case has proven to be quite complex and expensive. Moreover, practice has shown that especially when using very large modules it is not easy to maintain the tightness of the embedding seal and prevent leakage over long periods of use.

SUMMARY OF THE INVENTION

It is therefore an object of the invention to provide an apparatus of the type initially described for substance-specific treatment of fluids, in which the cited disadvantages in the prior art are at least reduced and which is relatively easy to manufacture. The apparatus should be flexibly adaptable to the respective fluid treatment and in particular enable different substance-specific treatments simultaneously and/or different substance-specific treatments in direct succession.

It is furthermore an object of the invention to provide a process for efficient substance-specific treatment of fluids using semi-permeable membranes with porous structure, wherein the cited disadvantages are at least reduced.

The object is achieved by an apparatus in accordance with the preamble of claim 1 wherein the treatment elements are combined to form at least one group of treatment elements, comprising first and second treatment elements, the treatment elements within the group being adjacent to each other in a direction substantially perpendicular to the extent of the housing between the inlet and outlet arrangements, wherein the distribution space is delimited only by the housing, the inlet arrangement, and the ends, pointing toward the inlet arrangement, of the group of the treatment elements adjacent to the inlet arrangement, wherein the collection space is delimited only by housing, the outlet arrangement, and the ends, pointing toward the outlet arrangement, of the group of the treatment elements adjacent to the outlet arrangement, and wherein the walls of the treatment elements are at least in part formed from at least one semi-permeable membrane with a porous structure.

The object is furthermore achieved by a process for substance-specific treatment of a fluid using this apparatus, the process comprising at least the steps of:

a) Introducing the fluid to be treated into the distribution space via the inlet arrangement of the housing;

b) Feeding at least a portion of the fluid to be treated from the distribution space into the cavities of the first treatment elements of a group of treatment elements and penetrating the walls of the first treatment elements, whereby a substance-specific treatment of the fluid takes place;

c) Passing out the fluid after substance-specific treatment out the walls of the first treatment elements;

d) Feeding at least a portion of the fluid after substance-specific treatment in the first treatment elements into, and penetrating, the walls of the second treatment elements of the group, whereby a substance-specific treatment of the fluid penetrating the walls of the second treatment elements takes place;

e) Passing the fluid after substance-specific treatment in the second treatment elements out the cavities of the second treatment elements;

f) Collecting the treated fluid in the collection space; and g) Removing the treated fluid via the outlet arrangement of the housing.

Due to the design of the treatment elements, the side of the walls pointing toward the cavity of the treatment elements or of the membrane forming the walls will be termed the inside of the treatment elements or membrane, and the side of the walls of the treatment elements or of the membrane forming the walls pointing away from the cavity will be termed the outside of the treatment elements or membrane.

Fluids to be treated in the context of the present invention are understood to be those fluids that contain specific substances that are the target of the substance-specific treatment.

The first and second treatment elements in the apparatus of the invention are arranged in the housing without the need for embedding encompassing the ends of the treatment elements, i.e., the ends of the treatment elements are free from any embedding encompassing the ends of all treatment elements of a group. The result is that the treatment elements of the group of treatment elements adjacent to the inlet arrangement, with its ends directed toward the inlet arrangement, are in direct communication to and delimit the distribution space. Likewise, the treatment elements of the group of treatment elements adjacent to the outlet arrangement, with its ends directed toward the outlet arrangement, are in direct communication to and delimit the collection space.

Compared to prior-art apparatus, which always require embedding the treatment elements with epoxy resin, for example, an apparatus designed in the aforementioned manner offers the advantage that there are significantly fewer demands placed on material selection, since potential material problems attributable to embedding can be disregarded. As previously discussed, the embedding materials used in the prior-art apparatus can cause serious problems when used for substance-specific fluid treatments.

The association of the distribution and collection spaces with the inlet and outlet arrangements, respectively, means that the side of the group of treatment elements pointing toward the distribution space, i.e., the side at which the at least one first treatment element has its opening, is the inflow or up-stream side, from which the fluid to be treated flows to the group of treatment elements. The opposite side, at which the at least one second treatment element has its opening and which points toward the collection space, therefore represents the outflow or downstream side.

Preferably, the first and second treatment elements of a group have the same length, and the treatment element ends in a group that point toward the inlet arrangement and those that point toward the outlet arrangement each lie substantially in a plane that is perpendicular to the direction taken by the housing between the inlet and outlet arrangements.

The treatment elements combined to form a group constitute a treatment stage. In this case, a group of treatment elements constituting a stage can also be composed of multiple subgroups containing at least one first and one second treatment element. To increase the efficiency of the substance-specific treatment, it is of advantage for steps b) to d) of the process of the invention to be conducted multiple times. This can be accomplished by arranging multiple groups of treatment elements or stages sequentially in the housing in the direction taken by the housing between the inlet and outlet arrangements, i.e., in the direction of the flow through the housing. By sequentially arranging a plurality of stages, the dimension of the individual stage in the direction of the flow through the housing can be kept short. In the apparatus of the invention the number of stages is preferably between 1 and 100 and most preferably between 1 and 10.

It is advantageous in this case if the individual stages are spaced from one another, to enable thorough mixing of the fluid stream leaving a stage, which might be required to prevent concentration fluctuations, before it is directed to the next stage. The intermediate space thus generated is, in analogy to the distribution and collection spaces, delimited only by the housing wall and the ends of the adjacent groups of treatment elements pointing toward the intermediate space, on the one hand functioning as a collection space for the group of treatment elements adjacent in the direction of the inlet arrangement and at the same time as a distribution space for the group of treatment elements adjacent in the direction of the outlet arrangement. This intermediate space can be filled with fluid-permeable elements in the form of nonwovens, grids, or fabrics, to improve the radial and tangential intermixing of the fluid leaving a stage and at the same time serve a support function, if required, for the groups of treatment elements. In the same manner, in individual cases, the distribution and/or collection space of the apparatus of the invention can also contain a fluid-permeable element serving to make the flow uniform and/or to provide a support function for the adjacent treatment element groups.

Of course, in adapting to the requirements of the treatment process, it is also possible to sequentially arrange a plurality of apparatus of the invention, each preferably containing a plurality of treatment element stages.

The treatment elements forming a group can be spaced from each other and from the housing wall. In this case, one portion of the fluid to be treated flows via the distribution space situated ahead of a group of treatment elements in the direction of the flow through the housing, through the channel system formed by the intermediate spaces between the treatment elements and between the inner wall of the housing and adjacent treatment elements. Another portion of the fluid stream flows into the cavities of the first treatment elements, which are open toward the inlet arrangement and closed toward the outlet arrangement, and passes through the walls of the first treatment elements consisting at least in part of at least one semi-permeable membrane, in the process of which this portion of fluid is subjected to a substance-specific treatment with respect to target substances contained in the fluid. Subsequently, this partial stream flows out into the outer space enclosing the first treatment elements, where mixing with the part of the fluid passing through the channel system takes place.

Due to the pressure gradient along the treatment elements generated by the flow in the channel system, a portion of the partial stream flowing through the channel system flows into the second treatment elements and through their semi-permeable walls. In this case as well, a substance-specific treatment takes place with respect to target substances contained in the fluid. The partial stream thus treated then flows into the cavities open in the direction of the outlet arrangement and through their openings out of the treatment elements and is collected in the collection space situated following the group of treatment elements in the direction of the flow through the housing.

The relative sizes of the cited partial streams depend on several conditions, such as the pressure drop in the porous walls of the membrane elements, the distance between the treatment elements and between the treatment elements and the inner wall of the housing and thus on the cross-sectional dimension of the stream channels formed in the intermediate space or on the pressure gradient in these stream channels along the treatment elements.

For this case, in which the treatment elements constituting groups are spaced from one another and from the inner wall of the housing, it is advantageous for the treatment elements forming a group to be held by spacers, so that a system of defined channels is formed around the treatment elements, allowing uniform flow through the group of treatment elements and around the individual treatment elements. Furthermore, the spacers can be used to adjust the size of the flow cross-sections of the channels and thus influence the pressure gradient generated within the channels.

It is practical for the spacers to be designed such that they have an elastic component. In this way, such a group of treatment elements can be inserted easily in the apparatus housing by slightly pressing the group together, by that somewhat reducing the space between the treatment elements, inserting it into the housing, and then releasing it, resulting in increased spacing between the treatment elements. As a result, the circumference of the group of treatment elements contacts the housing inner wall, thus preventing undesired peripheral flow along the housing inner wall.

An embodiment of the invention is preferred, however, in which the treatment elements are arranged in the housing in such a way that the intermediate space between the treatment elements within a group and between the treatment elements and the housing inner wall is minimized. Ideally, the outer walls of the first and second treatment elements of a group are in direct contact with each other.

In this preferred embodiment with minimized intermediate space, the fluid to be treated flows, except for possibly a small leakage stream through the intermediate space, completely from the distribution space, situated in the direction of the flow through the housing preceding a group of treatment elements, into the cavities of the first treatment elements, open toward the inlet arrangement and closed toward the outlet arrangement, passes through the inside of the walls of the first treatment elements, consisting at least in part of at least one semi-permeable membrane, and through the walls, in the process of which the fluid is subjected to a first substance-specific treatment with respect to target substances contained in the fluid. Subsequently, the fluid so treated flows via the outside of the walls of the first treatment elements out of the first treatment elements.

The fluid thus treated then flows, except for possibly a small leakage stream through the intermediate space, via the outside of the adjacent walls of the second treatment elements, through the walls of the second treatment elements, consisting at least in part of at least one semi-permeable membrane. In this case, the fluid is subjected to an additional substance-specific treatment with respect to target substances contained in the fluid. Subsequently, the fluid stream subjected to this further substance-specific treatment flows via the inside of the walls of the second treatment elements into the cavities of these treatment elements, open toward the outlet arrangement and closed toward the inlet arrangement, and flows from these cavities into the adjacent collection space, which is possibly at the same time the distribution space with respect to the following treatment stage.

Depending on how densely the first and second treatment elements within a group are arranged, a more or less significant leakage stream through the intermediate spaces between the treatment elements will occur, so that not all of the fluid stream subjected to the first substance-specific treatment in the same stage is also subjected to the second substance-specific treatment. Additionally, depending on the design of the first treatment elements, a portion of the fluid flowing through the first treatment elements can flow directly into the adjacent collection space through the ends of the first treatment elements closed toward the outlet arrangement. It is also possible that a certain portion of the fluid stream will directly enter the second treatment elements via the closed ends of the second treatment elements pointing toward the inlet arrangement, without having first passed through a first treatment element.

Preferably, however, an attempt is made to minimize these partial streams that have not passed through both first and second treatment elements, in order to maximize the efficiency of the substance-specific treatment. For this reason, it is advantageous for the filling ratio $\epsilon$ of the housing within one stage to be between 0.6 and 0.999, and especially advantageous for the filling ratio $\epsilon$ to be between 0.95 and 0.999. The filling ratio $\epsilon$ is defined as $V_T/(V_T+V_I)$, where $V_T$ is the sum of the volumes $V_t$ of the individual treatment elements in the stage and $V_I$ is the volume of the intermediate space formed between the treatment elements of the stage and between the housing inner wall and the stage's treatment elements adjacent thereto. The volume of an individual treatment element $V_t$, in turn, is the volume $V_w$ of its walls and the volume $V_c$ of its at least one cavity.

As previously discussed, a further step to maximize the efficiency of the substance-specific treatment is the sequential connection of multiple stages of treatment elements. At the same time, this reduces the probability that the partial stream flowing through the channel system between the treatment elements, or the leakage stream, leaves the housing via the outlet arrangement without having passed at least once through the membrane wall of a first and a second treatment element, and this reduction is increased as the number of stages increases.

By adjusting the dimension of the treatment elements, it is possible with the apparatus of the invention to control the flow resistance to be overcome by the fluid to be treated in passing through the cavities of the first and second treatment elements of a group, such that it remains low compared to the flow resistance generated by the passage through the semi-permeable walls of the treatment elements. In a preferred embodiment, the flow resistance in passing through the cavities of the first treatment elements is equal to the flow resistance in passing through the cavities of the second treatment elements of a group. This results in substantially uniform passage through the membrane walls over the extent of the treatment elements between the inlet and outlet arrangements.

Depending on the application, the relationship of the hydraulic diameter $D_F$ of the totality of the cavities of the first treatment elements of a group to the hydraulic diameter $D_S$ of the totality of the cavities of the second treatment elements of the group is such that $0.9<D_F/D_S<1.1$. The hydraulic diameter $D_F$ or $D_S$ is the sum of the hydraulic diameters $D_f$ or $D_s$ of the cavities of the individual first or second treatment elements, with the hydraulic diameter defined as $4*A/C$, where A is the area of the flow cross-section perpendicular to the direction of flow through the housing and C is the circumference of the flow cross section of the respective cavity. Such a design of the treatment elements with respect to the hydraulic diameters of their cavities is of particular advantage if the fluid undergoing treatment is a clear liquid, for example.

In a preferred embodiment of the apparatus of the invention, in which substance-specific treatments take place in the walls of the treatment elements, it is important to dimension the treatment elements such that the fraction of the volume of the treatment element consisting of semi-permeable, porous membrane wall, in which the substance-specific treatments can occur, is maximized per treatment element. A preferred ratio $V_w/V_t$ of the volume of the walls of a treatment element $V_w$ to the treatment-element volume $V_t$ comprising the volume of the walls $V_w$ and the volume of the at least one cavity $V_c$ is in the range $0.4<V_w/V_t<0.9$, and an especially preferred ratio is in the range $0.6<V_w/V_t<0.8$.

Furthermore, it is advantageous for the longitudinal dimension of the treatment elements and their cavities to be in the direction of the flow through the housing, to enable, per unit of housing volume, a large wall volume of the treatment elements with minimal pressure loss for flow through the treatment elements within this unit of volume. A dimensional ratio L/D of the cavities between 2 and 4000 is advantageous, where L is the cavity dimension in the direction of the flow through the housing and D is the hydraulic diameter of the respective cavity cross-section perpendicular thereto. Dimensional ratios L/D between 10 and 400 are especially advantageous.

Treatment elements are preferred whose walls have a substantially uniform thickness. In preferred embodiments of the invention with $0.9<D_F/D_S<1$, the fluid to be treated, in passing through the membrane, must overcome essentially the same flow resistance at each location of a treatment element, which is of particular advantage in the interest of as uniform a residence time of the fluid to be treated as possible.

In a preferred embodiment of the invention, the fluid to be treated transports the target substance or substances convectively through the membrane. This requires that the porous structured, semi-permeable membranes used in constructing the treatment elements have a pore size that permits convective transport of these substances through the membrane. In the application, the pore size must also be adapted to the size of the target substance or substances, which can be present in the form of dissolved molecules or macromolecules or also as small particles with a size in the submicrometer range. It can also be necessary, however, for the membranes, or at least a part of the membranes, of which the first and second treatment elements are comprised to perform a separation function and, as can be the case in the substance-specific treatment of suspensions, to retain components contained in the fluid to be treated. This means that the pore size must not exceed a certain maximum value. This can also prevent undesired interactions between such components to be separated and groups in the membrane that are intended to interact with other target substances entering the membrane.

The invention also relates to substance-specific treatments in which the sole function of the treatment elements is to separate by size and interactions between the target substances and substance-specific groups in the membrane do not take place. The target substances in this case are separated solely on the basis of their size in the treatment elements, and separation into size classes is performed, for example.

On the other hand, in the light of the applications of the apparatus of the invention or the embodiments of the process of the invention, described in the following, it is potentially important to use membranes with minimum pore sizes and maximum pore volume or porosity, in order to provide maximum inner surface area for the substance-specific treatment. Preferably, the membranes used in accordance with the invention have a mean porosity between 50% and 90% by volume. The mean porosity is understood to be the ratio of the pore volume of the membrane to the membrane volume, where the membrane volume is the sum of the pore volume and the volume of the material constituting the membrane structure.

The requirements placed on the construction of the membrane, i.e., on its structure and pore size distribution across the membrane thickness, are given by the respective application for the substance-specific treatment. The membrane structure can be isotropic across the thickness, i.e., the pore diameters are essentially constant within the membrane structure. It can be anisotropic, symmetrical, or asymmetrical, or the membranes can have a layer of denser pore structure, such as a skin, on at least one side. In the case of an asymmetrical membrane, the denser layer can be located on the inside, i.e., the side of a respective treatment element oriented toward the cavity of the treatment element, or on the outside, i.e., the side of the treatment elements oriented away from the cavity. It can also lie, for example, on the side of the treatment elements pointing in the direction of the flow. In a substance-specific treatment, due to the size of the target substance or substances, this results in membranes forming the treatment elements acting as deep-bed filters and the size classes retained by the respective layer with denser pore structure collecting in the respective membrane.

In accordance with the respective application, it can be advantageous to arrange the denser layers on the respective sides of the first and second treatment elements to which the flow is directed. Depending on the size of the pores in the denser layers in the fluid to be treated, for example, molecules or suspended particles of certain size classes are retained by the membranes and thus do not participate in an additional substance-specific treatment that might occur in the pore structure of the membranes.

For example, it can be necessary in a substance-specific treatment of suspensions for the membrane forming the first treatment elements to have a small pore diameter on the side toward the cavity, in order to effect a specific separation action. To obtain at the same time as large a fluid flow as possible through the membrane or the treatment elements, however, it is practical for the remaining membrane structure to have coarser pores, but, depending on the application, not too coarse, in order to attain as large an inner surface area as possible.

Membranes are preferred with a mean pore diameter between 0.01 and 10 $\mu$m, and those with a mean pore diameter between 0.1 and 3 $\mu$m are especially preferred.

To determine the mean pore diameter, different methods are used depending on the pore diameter and membrane structure. For pore structures that are essentially isotropic, pore diameters are determined indirectly by a filtration experiment in which an aqueous dextran solution with a prescribed size distribution of dextran molecules is filtered through the membrane. From the measured relative retention as a function of the nominal molecule diameter, the pore diameter distribution is calculated and from it the mean pore diameter. This method is described, for example, by K. Sakai, J. Membrane Science 96 (1994), pp. 91–130, and by Shin-ichi Nakao, J. Membrane Science 96 (1994), pp. 131–165, for dialysis and filtration membranes, respectively.

For anisotropic membranes, which have a layer with denser pore structure, for example, the cited determination methods based on filtration experiments are also used to determine the mean pore diameter within the denser layer. To determine the mean pore diameter of the coarser pore areas of the anisotropic membranes, an image-analysis method according to L. Zeman et al., J. Membrane Science 71 (1992), pp. 221–231, is employed. This method is suitable for pore sizes between 0.1 $\mu$m and 10 $\mu$m, by its nature for both isotropic and anisotropic pore structures.

For applications of the apparatus or process of the invention for liquids such as clear solutions or suspensions in particular, it is advantageous for the membranes to have an essentially constant mean pore diameter over at least 80% of the thickness. This permits a high inner surface area coupled with a large number of immobilized, substance-specific groups in the membranes and at the same time a low pressure drop. An essentially constant mean pore diameter is understood to be one that changes in the cited dimension of the membrane by not more than +/−50%.

For applications in which the fluid to be treated is a suspension, the membranes the treatment elements are made from advantageously have a layer on at least one side that has a smaller mean pore diameter than the region of the membrane with essentially constant mean pore diameter which is adjacent to this layer. In a preferred embodiment of the invention, this layer is between 1 $\mu$m and 5 $\mu$m thick and has a mean pore diameter that is 5 to 50 times smaller than the mean pore diameter in the adjacent area.

In the apparatus of the invention, or to conduct the process of the invention, preferably porous membranes with a large inner surface area are used. Porous membranes have proven satisfactory that have a BET surface area between 2 and 300 $m^2$ per $cm^3$ of membrane volume, and those membranes with a BET surface area between 8 and 30 $m^2$ per $cm^3$ of membrane volume have proven especially satisfactory. The BET method for determining the surface area of porous membrane structures, which is based on the measurement of nitrogen adsorption, is described by K. Kaneko, J. Membrane Science 96 (1994), pp. 59–89.

Depending on the desired application of the apparatus or process of the invention, the membranes forming the first treatment elements and those forming the second treatment elements can be the same or different. Differences can be with respect to their pore structure or pore diameter, for example, but also with respect to the membrane-contained groups that are intended for interaction with the target substances contained in the fluid to be treated. Moreover, the treatment elements can differ with respect to their designs, such as the size of their cavities.

The membranes forming the treatment elements of different stages can also be the same or different depending on the application. They can differ with respect to their pore structures or their pore diameters. As discussed, the pore diameter of the membranes can decrease from stage to stage in the direction of the flow through the housing of the apparatus of the invention, for example in the substance-specific treatment of suspensions to fractionate the suspended particles. Different stages can also have treatment elements comprising differing membranes forms, as will be discussed in the following. Of course, the membranes used in different stages can also differ with respect to immobilized substance-specific groups, which then can interact with different target substances.

In the context of the present invention, hollow-fiber or flat membranes are preferably employed in forming the treatment elements. However, other membrane forms such as membrane tubes or membrane pipes are included.

In the case of the preferred use of hollow-fiber membranes, the wall of the hollow-fiber membrane is also the wall of the at least one cavity of the treatment elements, and the hollow-fiber membrane is closed at one end. The cavity is formed by the lumen and delimited by the inside of the hollow-fiber membrane.

Treatment elements for the invention can easily be generated using hollow-fiber membranes. By closing one end of hollow-fiber membrane segments, for example by heat sealing, treatment elements can be made with a cavity open on one end. It is also possible, however, to close off one end of the hollow-fiber membrane segment using a plug or an adhesive. In this case, the closed end of the treatment element is formed by the end of the hollow-fiber membrane itself, together with the plug or adhesive.

By folding the hollow-fiber membrane segments transversely to the longitudinal axis, depending on the design, treatment elements with two cavities open on one side or treatment elements with one cavity that has two openings in the same direction are generated. When serving as first treatment elements, they must be inserted in the housing of the apparatus of the invention in such a way that the openings point in the direction of the inlet arrangement of the apparatus. If they are used as second treatment elements, they must be inserted in the housing of the apparatus of the invention such that the openings point in the direction of the outlet arrangement of the apparatus.

Hollow-fiber membranes with differing outer contours, i.e., differing outlines when viewed in cross-section, can be used. The hollow-fiber membranes can, for example, have a contour that is essentially round or circular, triangular, rectangular, hexagonal, or octagonal. They can also be oval, elliptical, or with three or four lobes, etc. Contours are preferred with which high filling ratios $\epsilon$ can be realized, such as contours that are approximately triangular, rectangular, square, or hexagonal.

For use in the apparatus of the invention or to conduct the process of the invention, hollow-fiber membranes have proven satisfactory that have a wall thickness between 15 $\mu$m and 900 $\mu$m, and hollow-fiber membranes with a wall thickness between 100 $\mu$m and 300 $\mu$m have proven especially satisfactory. Preferably, the hydraulic diameter of the lumen of the hollow-fiber membranes employed is 50 $\mu$m to 900 $\mu$m, and hollow-fiber membranes with a hydraulic diameter of the lumen between 100 $\mu$m and 400 $\mu$m are especially preferred.

To facilitate handling, the hollow-fiber membranes of one group of adjacent treatment elements are advantageously bound with textile threads into at least one hollow-fiber mat with hollow-fiber membranes that are essentially parallel to one another. Using known methods, such mats can be generated as knitted mats, woven mats or small woven ribbons, or also as crocheted mats. In the case of wovens or knits, the textile threads are the woven or knit threads running transversely to the hollow-fiber membranes. Such mats can be used to produce groups of adjacent treatment elements which have a high order and at the same time a high packing density.

Preferably, the hollow-fiber membranes are arranged in the mats as first and second treatment elements such that the mats contain pairs of first and second treatment elements. In this respect, it has proven satisfactory for appropriately dimensioned hollow-fiber membranes with cavities open on one side to be bound parallel to each other in the mat such that the openings of the cavities of adjacent hollow-fiber membranes are arranged on opposite sides of the hollow-fiber mat. In this manner, such a hollow-fiber mat contains pairs of first and second treatment elements.

Groups of treatment elements generated from such hollow-fiber mats comprise at least one hollow-fiber mat formed in this way, which is spirally wound using known methods around a winding axis or core parallel to the hollow-fiber membranes and essentially parallel to the extent of the housing between the inlet and outlet arrangement. According to another embodiment of the invention, such mats are stacked in individual mat layers or folded mat layers, where the hollow-fiber membranes in the resulting stack are preferably parallel to one another.

An especially preferred method of binding hollow-fiber membranes with cavities open on one side into a hollow-fiber mat is one in which the openings of all cavities are arranged on the same side of the hollow-fiber mat. Such hollow-fiber mats can advantageously be subsequently processed to form groups of adjacent first and second treatment elements by stacking multiple mats as layers on one another such that the closed ends of the hollow-fiber membranes are, from layer to layer, alternately on opposite sides of the stack. Preferably, spirally wound groups of first and second treatment elements formed from these mats are used that consist of at least one pair of these mats, where the mats of a pair are superimposed such that the opening of the hollow-fiber membranes of the first mat and those of the hollow-fiber membranes of the second mat are situated on opposite sides and such that the at least one pair is wound spirally around an axis parallel to the hollow-fiber membranes and parallel to the direction taken by the housing between the inlet and outlet arrangements.

Mats with hollow-fiber membranes closed on one side can be generated, for example, from meander-form woven or knitted hollow-fiber membrane mats on whose side edges the hollow-fiber membranes form an arch and for this reason are initially closed at these edges. By cutting off the end arch at one edge of such a mat, the hollow-fiber membranes can be opened on one side. Preferably, however, such a meander-form woven or knitted mat of hollow-fiber membranes is divided in the middle, so that two halves with hollow-fiber membranes are generated whose cavities are open on one side. After superimposing the two halves, a mat arrangement is obtained in a simple manner with two layers in which the open ends of the hollow-fiber membranes lie on opposite sides. This double-layer mat structure can be subsequently processed by stacking or spiral winding, for example.

Membrane hollow-fiber elements with more than one continuous cavity extending along the hollow-fiber axis, such as are described in DE-OS 30 22 313, which can also be formed as membrane hollow-fiber chains with a plurality of cavities parallel to each other, such as disclosed in DE-OS 28 42 835, for example, can also be used to produce groups of first and second treatment elements. Groups of first and second treatment elements can likewise be generated from segments of membrane hollow-fiber chains of appropriate length, for example by simply stacking a plurality of chain segments as layers, if the individual chains are closed at one end, the longitudinal axes of the cavities in the chains of the stack are essentially parallel to each other, and the closed ends of consecutive layers are located on opposite ends of the stack. Particularly when the outer contour of the individual membrane hollow-fiber chains is approximately rectangular, groups of treatment elements can be constructed with a very small spacing between the treatment elements, permitting high filling ratios $\epsilon$.

The described groups of hollow-fiber membranes are inserted into the housing of the apparatus of the invention such that the hollow-fiber membranes are arranged parallel to the axis of the housing. The hollow-fiber membrane treatment elements whose openings point toward the inlet arrangement become first treatment elements, and those whose openings point toward the outlet arrangement become second treatment elements.

In accordance with another preferred embodiment of the invention, the treatment elements are formed from at least one flat membrane. Such treatment elements made from flat membranes can be generated, for example, by U-shaped folding of preferably rectangular or square sections of a flat membrane. The two flanks formed by the U-shaped folding of such a flat-membrane section are separated by spacers and thus, together with the closed folded edge, form the cavity.

In accordance with another advantageous embodiment of the invention, two equal-sized flat membranes, spaced from one another by spacers and essentially parallel, are used to form a flat-membrane treatment element. These are arranged such that their edges run parallel to each other and are positively joined at one edge, such as by heat sealing or adhesive, so that the flanks of the treatment elements are formed by the flat-membrane sections. The cavity in turn is formed by the flanks and the positively joined edge.

The two flat membrane sections can be identical or different, for example, with respect to their material, structure, or the groups provided for interacting with target substances. One of the membranes can also be replaced by a fluid-impermeable film, for example, where this is deemed desirable for reasons of stability of the treatment elements or for production considerations.

The spacers, which as mentioned ensure a defined spacing between the flanks of the treatment elements made from flat membranes and possibly films, and at the same time should be fluid-permeable, can exist as separate elements. The spacers used can be a fluid-permeable material such as a nonwoven or woven fabric. The spacer function on the inside of the membrane can also be integrated into the membrane or film itself, however, such as by surface structures with grooved, nubbed, or other profiles.

The flat membranes used in the apparatus of the invention or to conduct the process of the invention preferably have a wall thickness between 15 $\mu$m and 500 $\mu$m, and a wall thickness between 100 $\mu$m and 300 $\mu$m is especially preferred.

For practical reasons, the two edges of the treatment element adjacent to the folded or positively joined edge are also closed, for example by heat sealing. Flat-membrane treatment elements open on these edges are not recommended, due to potential leakage and short-circuit streams during use.

Treatment elements generated in this manner can be used in flat form. These are stacked next to one another in groups of first and second treatment elements and inserted into the apparatus housing. The folded or positively joined edge of the first treatment elements points according to the invention toward the outlet arrangement, and the cavity between the flanks of a respective first treatment element is open toward the inlet arrangement. The folded or positively joined edge of the second treatment elements points accordingly toward the inlet arrangement of the apparatus, and the cavity between the flanks of a respective second treatment element is open toward the outlet arrangement. Preferably, the groups with such a stack structure have an alternating sequence of first and second treatment elements, so that these first and second treatment elements can be related to one another as pairs.

An embodiment has proven satisfactory in which the folded or positively joined edges, pointing toward the inlet or outlet arrangements, of the treatment elements of two consecutive stages of the apparatus of the invention form an angle between 5° and 175°, viewed in the direction of the extent of the housing between the inlet and outlet arrangements. Preferred angles are 30°, 45°, and 90°. In this manner, improved flow distribution is attained after each stage, since covering the openings of the first treatment elements of the respective next stage is avoided and the formation of a peripheral stream, across all stages, between treatment elements and the housing inner wall is prevented.

The described flat treatment elements can also be further processed into spirally wound groups of treatment elements. In this case, a group of at least two planar treatment elements is preferably stacked such that the folded or positively joined edges of the treatment elements are situated on opposite sides of the stack. This stack is then spirally wound around a winding axis or core perpendicular to the folded or positively joined edges. Especially preferred is an embodiment with at least one pair of treatment elements made from flat membranes, which are superimposed such that the closed edges are located on opposite sides. This at least one pair of first and second treatment elements is then wound spirally around a winding axis or core that is perpendicular to the edges formed by folding or positive joining and essentially parallel to the direction of the extent of the housing between the inlet and outlet arrangements.

Advantageously, the two individual wound layers thus generated are directly adjacent to one another, so that surface pressure between the winding layers can be used to minimize a potential leakage stream between the treatment elements when using the apparatus of the invention. Such spirally wound groups of treatment elements are advantageously arranged in the housing of an apparatus of the invention such that the direction of the winding axis is the same as that taken by the extent of the housing between the inlet and outlet arrangements.

From two flat membranes, or preferably one flat membrane and a film, treatment-element units can be generated in a simple manner with a plurality of cavities that are arranged sequentially in the direction of flow and are open on one end. By appropriate combination of such treatment-element units, multiple stages of first and second treatment elements can be combined.

Such treatment-element units can be generated, for example, by superimposing a flat membrane, of appropriate length in the direction of the flow through the housing of the apparatus of the invention, i.e., in the longitudinal direction, with a film of the same size and an intermediate fluid-permeable spacer. The flat membrane is cut through along its longitudinal dimension at several locations, preferably at equidistant intervals, perpendicular to the longitudinal axis. To form first treatment elements, the cut edges lying in the direction of the inlet arrangement, together with the spacer, are positively joined to the film in a fluid-impermeable manner by heat sealing or adhesive, for example. In this way, cavities are formed that are closed in the direction of the outlet arrangement, with one flank being formed by the continuous film and the second flank by the flat membrane divided by the incisions. The cut edges lying in the direction of the outlet arrangement remain open and thus, together with the spacer, form the openings of the cavities of the resulting first treatment elements.

To form a treatment-element unit with second treatment elements, the cut edges lying in the direction of the outlet arrangement, together with the spacer and the film, are joined positively and fluid-tight by heat sealing or adhesive means, for example, forming in this manner cavities that are closed in the direction of the inlet arrangement. The cut edges lying in the direction of the inlet arrangement, on the other hand, remain free and, together with the spacer, form the openings of the cavities of the thus-generated second treatment elements.

A treatment element unit formed in this manner, with first treatment elements, is combined pairwise with a corresponding unit with second treatment elements, such that consecutive pairs of first and second treatment elements are generated. In this case, the treatment-element units are arranged such that the flanks, formed by the flat membranes, of the first and second treatment elements point toward each other, and the openings of the cavities of the first treatment element and the closed ends of the cavities of the second treatment element are essentially in the same plane, which also means that the first and second treatment elements are of equal length in each case. From such pairs of treatment-element units, treatment-element units with a plurality of integrated stages of treatment elements can be generated in a simple manner by stacking a plurality of these pairs or by winding at least one such pair spirally.

Of course, other treatment-element units can be generated by appropriate changes in the sequence of the free cut edges and the cut edges joined to the film. These treatment-element units have an alternating sequence of first and second treatment elements. Such treatment-element units are likewise combined in pairs such that pairs of adjacent first and second treatment elements are formed. Preferably, however, treatment-element units are used that have only first or only second treatment elements.

It is of course also possible to use a second flat membrane in place of the film.

When using treatment elements made from flat membranes, or when using treatment elements made from hollow-fiber membranes, various steps can be taken to attain the preferred high filling ratios $\epsilon$ and/or to minimize leakage streams between the treatment elements.

It is of course practical, when stacking adjacently arranged planar flat-membrane treatment elements, to arrange them such that the outsides of the adjacently layered treatment elements are in direct contact with each other, in order to attain the preferred high filling ratios of the invention. The same applies to spirally wound treatment elements made from flat membranes, which for practical reasons are wound such that the individual layers are in direct contact with each other. In this manner, the leakage stream through the intermediate spaces between the treatment elements can be adequately minimized.

In special cases, the outside of the treatment elements can have "sealing lips" to further minimize the leakage stream. These can be formed, for example, by applying a mono-filament thread perpendicularly to the direction of the flow between the inlet and outlet arrangement, so that, via the force of pressure with which the adjacently arranged treatment elements are held together, the harder mono-filament thread is pressed into the softer membrane structure and thus provides a sealing function. The function of such a thread, however, can also be integrated by appropriate structuring in one of the outer sides of the membrane or film. In other special cases, however, it is also possible to attain a seal between the treatment elements by adhesively joining the outer sides of the treatment element, such as in the form of a silicone strip.

Additional seals of this type are also conceivable in the case of treatment elements made from hollow-fiber membranes, in order to seal off the wedge regions generated between the hollow fibers. Not just a minimization of the leakage streams but also an increase in the filling ratios $\epsilon$ can be achieved by a suitable deformation of the hollow-fiber membranes in treatment elements made therefrom. For example, hollow-fiber membranes with round contour can be converted to an approximately rectangular shape by calendering a hollow-fiber mat with round hollow-fibers. Higher filling ratios $\epsilon$ can be attained with rectangular hollow-fiber membranes.

Another possibility is to subject the treatment elements to a swelling process. Such a process, which can be conducted for treatment elements made from hollow-fiber or flat membranes, can take place after introducing the groups of treatment elements into the housing of the apparatus of the invention, for example by then conducting a chemical coupling of substance-specific groups in the membranes.

When using treatment elements made from flat membranes, flat intermediate elements can also be introduced between the first and second treatment elements. These are fluid-permeable, at least perpendicularly to their planar dimension. These intermediate elements can be in the form of nonwovens or also as flat membranes and, with appropriate design, can likewise contribute to a substance-specific treatment of the fluid.

The shape of the inner cross-section of the housing, in which the treatment elements combined into groups or the stages of treatment elements are arranged, can be freely selected. Preferably, however, for hollow-fiber and flat membranes, housings are used with square, rectangular, hexagonal, octagonal, or round inner cross section.

The treatment-element groups, which preferably have an elastic component, are inserted into the housing under slight compression and positioned within the housing under relaxation of this compression.

In the case of flat membranes, therefore, the spacers used for supporting the cavities, for example in the form of woven fabrics or nonwovens, are those that exhibit elasticity perpendicular to their surfaces. In the case of treatment elements made from flat or hollow-fiber membranes, however, it is practical if the membranes themselves are elastically compressible, or in the case of hollow-fiber membranes if a deformation of the cross-section is possible.

With treatment elements made from hollow-fiber membranes, a relatively large injection needle or large-diameter cannula can serve as the housing, in which, for example, a plurality of treatment-element stages are arranged in sequence. For other applications, a flexible housing, made from an elastic tube, for example, has proven satisfactory. To facilitate introduction of the groups or stages of treatment elements, the housing can also be designed as radially shrinkable, whereby shrinking is performed after the treatment elements have been inserted. Particularly with housings that are long in relation to their diameter, it can be advantageous to wind or shape the housing in a spiral or helix. A plurality of housing segments can also be arranged in sequence linearly or in a meandering course.

A fixed connection between the treatment elements and the inner wall of the housing is normally not necessary. In special cases, however, it is also possible to join the treatment elements of a stage that are adjacent to the inner wall of the housing to the inner wall, for example with polyurethane, epoxy resin, thermoplastic, etc. In this manner, stable positioning of the respective group of treatment elements within the housing can be ensured, but this primarily aids in at least reducing peripheral flow between the housing inner wall and the treatment elements, and inaccuracies in the outer contour of groups of treatment elements can be compensated for. Furthermore, this can serve to seal off, for example, the described flat-membrane treatment elements at their ends, i.e. at the edges adjoining the folded or positively joined edge. Suitable methods of such joining of the treatment elements to the housing are described in EP-A-521 495, for example.

Due to the described embodiment of the apparatus of the invention, a significant advantage of the apparatus of the invention is its linear scalability. This is understood to be that the local conditions for substance-specific treatment in an apparatus with a housing of small diameter are the same as those in an apparatus with a housing of large diameter when the flow volume of the fluid to be treated is increased proportionally to the cross-sectional area of the housing.

The apparatus or process of the invention can be successfully employed in a wide variety of substance-specific fluid treatments. In an advantageous embodiment of the apparatus or process of the invention, preferably substance-specific groups are immobilized on and/or in the at least one membrane. These groups interact with the target substances present in the fluid to be treated. In light of the respective treatment method, multiple different substance-specific groups can also be immobilized on and/or in the at least one membrane forming a treatment element, the groups interacting specifically with various target substances. Different membranes with different substance-specific groups can also be combined if the application so requires. In this manner, different substance-specific treatments can take place in the first and second treatment elements and/or different substance-specific treatments can be conducted in the individual stages of an apparatus containing a plurality of stages of treatment elements.

In this context, there are applications in which one group of target substances to be removed are in part positively and in part negatively charged. Such groups of target substances can be removed from the fluid to be treated by employing, when conducting the process according to the invention, membranes with different charges. This can occur in such a manner that the membranes in different stages of treatment elements have substance-specific groups with differing charges.

An example is the removal of cytokine-inducing substances from infusion solutions or dialysate. It is well known that these cytokine-inducing substances are charged positively as well as negatively. The contact of these substances with white blood cells stimulates them to produce cytokines, with adverse side effects for the patient. By successively connecting treatment element stages with anionic and cationic properties in an apparatus of the invention, the entire target group can be removed by adsorption.

In accordance with another advantageous embodiment of the process of the invention, the substance-specific treatment takes place according to the specific sizes of the target substances contained in the fluid to be treated. For example, an apparatus with a plurality of successively arranged stages of treatment elements can also be used to conduct a fractionation of target substances contained in the fluid to be treated corresponding to their particle sizes, if the membranes forming the treatment elements have a decreasing pore diameter from one stage to the next in the direction of the flow through the housing. By subsequent elution with a flow opposite that through the housing, the various size fractions are eluted at different times, as in a chromatographic column, and thereby separated.

The process according to the invention has also proven satisfactory in the case of substance-specific treatments which comprise a combination of treatments on the basis of specific size of target substances contained in the fluid to be treated and those based on specific interactions between immobilized groups on and/or in the at least one membrane and target substances in the fluid.

One such application of the process of the invention is the HELP process, as described by D. Seidel, Therapeutische Rundschau, 47 (1990), pp. 514–519. In this process, heparin/LDL precipitate must be filtered off in a first step and heparin specifically adsorbed from the filtrate in a second step. This can be implemented in such a way that the first treatment elements are designed as a pure dead-end filter and the filter cake of heparin/LDL precipitate is drawn into their cavities. To provide appropriate capacity, the cavities of the first treatment elements have correspondingly large dimensions. The second membrane elements are provided with substance-specific groups for the heparin adsorption. It is of course also possible to design the first treatment elements such that they are also provided with substance-specific groups and are thus suited to adsorption of the heparin in addition to dead-end filtration.

Of course, other combinations of different substance-specific treatments using the apparatus or process of the invention are possible. In a preferred embodiment of the process of the invention, the fluid to be treated is recirculated and passes through the treatment process multiple times until the desired treatment level has been attained.

In accordance with an especially preferred embodiment of the invention, the substance-specific groups are ligands for affinity separation of ligates from liquids to be treated, or catalysts, where catalysts are understood to include biocatalysts such as enzymes. Preferred processes of the invention are those for cleaning/separation of ligates from a ligate-containing liquid, where membranes are selected on and/or in which ligands for these ligates are immobilized, and processes for catalytic treatment of liquid, where membranes are selected on and/or in which catalysts are immobilized. The catalytic processes also include biocatalytic processes such as enzyme processes.

For immobilization of substance-specific groups on and/or in the membranes, the processes described in the literature can be employed. The literature can also be used with respect to the substance-specific groups applying to the respective substance-specific treatment. Various possibilities for immobilization of substance-specific groups can be considered, with respect to both the location and manner in which they are immobilized.

These substance-specific groups can be coupled to the membrane by adsorption or via covalent bonds. This coupling to the membrane can take place prior to insertion into the housing or after inserting the membrane as a treatment element into the housing of the apparatus of the invention. Depending on the individual application, the substance-specific groups can, for example, be coupled essentially homogeneously to the entire surface of the porous membrane, i.e. both to the outer and inner surfaces formed by the pores, i.e. immobilized on and in the membrane. It can be necessary, however, for the substance-specific groups to be immobilized only on a portion of these surfaces, such as when individual components of the fluid to be treated are not to come into contact with the substance-specific groups. In such a case, it is practical for one thing to avoid a transport of these components through the membrane to the immobilized substance-specific groups by selecting a membrane with a suitable cut-off. It is also necessary in this case to keep the membrane or treatment-element surface to which the flow is directed, and thus subjected to the fluid still containing these components, free of substance-specific groups.

This can be accomplished, for example, by passivating this surface, such as by a chemical pretreatment or a plasma treatment, prior to coupling the substance-specific groups.

There can also be a direct inclusion of substance-specific groups in the membrane matrix, in the case of membranes made from polymeric materials by modification of the polymeric material with ionic, hydrophilic, or hydrophobic groups, for example, or by using polymer blends in which at least one polymer component has substance-specific groups.

Another possibility is to incorporate substance-specific groups or carrier substances or particles having such groups into the pore system of a membrane during its manufacture, or to flood these into the finished membrane, at a later stage. In the latter case, it is practical for the membrane to have an asymmetrical structure and possibly a skin, whereby the openings of the skin or the pores of the fine-pored side of the membrane are dimensioned such that the substance-specific groups or the cited carrier substances or particles cannot penetrate. The flooding in and the subsequent substance-specific fluid treatment are conducted such that the material streams enter the membrane from the open-pored side and the substances or particles carrying the substance-specific groups are retained by the side in which the pores are less open.

In the cases in which substance-specific groups are immobilized in the membranes, the pore size of the membrane used should be selected such that the target substances can be transported convectively through the membrane by the fluid to be treated despite the substance-specific groups immobilized in the pores.

There are no restrictions whatsoever with respect to the material from which the membrane of the invention is made. Membranes can be used that are made from inorganic materials such as glass, ceramics, $SiO_2$, carbon, or metal, or from organic polymers or blends thereof. The polymers can be hydrophilic or hydrophobic in nature. They can be selected from the group of cellulosic polymers such as cellulose or regenerated cellulose, modified cellulose such as cellulose esters, cellulose ethers, amine-modified celluloses, or blends of cellulosic polymers, from the group of synthetic polymers such as polyacrylonitrile and corresponding copolymers, polymers containing polyurethane, polyarylsulfones and polyarylethersulfones such as polysulfone or polyethersulfone, polyvinylidene fluoride, polytetrafluoro ethylene, water-insoluble polyvinyl alcohols, aliphatic and aromatic polyamides, polyimides, polyetherimides, polyesters, polycarbonates, polyolefins such as polyethylene, polypropylene, polyvinyl chloride, polyphenylene oxide, polybenzimidazoles and polybenzimidazolones, as well as from modifications, blends, mixtures, or copolymers derived from these polymers. Other polymers can be mixed as additives with these polymers or polymer blends, for example polyethylene oxide, polyhy droxyether, polyethylene glycol, polyvinylpyrrolidone, polyvinyl alcohol, or polycaprolactone, or inorganic substances such as $SiO_2$. In individual cases, the membrane can also have been subjected to a surface modification, for example, in order to establish certain properties of the membrane surface such as in the form of certain functional groups.

There has been particularly good experience with membranes made from solvent-stable and pH-stable polymers, in particular with membranes made from polytetrafluoroethylene or polyvinylidene fluoride, and from modifications, blends, mixtures, or copolymers derived therefrom. Such membranes are described in DE-A-39 23 128, for example. Celluloses and polyamides, and modifications, blends, mixtures, or copolymers obtained therefrom, have proven especially satisfactory, since they have adequate stability toward alkalis, and ligands can be covalently bound to them in a simple manner.

There are numerous applications known for cleaning/separation of ligates from a ligate-containing fluid using affinity separation or affinity chromatography. Affinity chromatography in this case is understood to be biospecific adsorption and also separation processes such as ion-exchanger chromatography, metal chelate chromatography, hydrophobic chromatography, covalent chromatography, or direct sorption of molecules onto a specific adsorber material.

Interesting applications relate to cleaning of monoclonal or polyclonal antibodies, removal of proteases for stabilizing biological fluids, recovering or therapeutically removing components from blood plasma, removing pyrogens from biological or pharmaceutical liquids, separating enantiomers, and isolating enzymes, just to mention a few examples.

As used herein, ligands can act non-specifically, group-specifically, or specifically (see E. Klein, "Affinity Membranes", John Wiley & Sons, Inc., 1991). Such ligands are, for example, monoclonal antibodies, polyclonal antibodies, peptides, antigenic substances, glycoproteins, protein A, protein G, enzymes, receptor proteins, growth factors for cells, hormones, regulation proteins, inhibitors, cofactors, heparin, protamine, poly-L-lysines, biotin, avitin, amino acids such as tryptophan, phenylamines, L-histidines, or antibiotics. Furthermore, the ligands can also be salts such as $Fe_4[Fe(CN)_6]_3$ or colorants. However, they can also be hydrophilic groups or ionic groups in the surface of the membrane material itself or polymers bound to the surface. Examples, not to be considered restrictive, are also cited in WO 90/04609, WO 90/05018, EP-A-0 565 978, and in E. Klein, "Affinity Membranes", John Wiley & Sons, Inc., 1991.

Without providing an exhaustive list of possibilities at this point, the ligands can be generated, for example, by surface modification of the membrane, bound to the surface directly or via spacer molecules, or bound to the surface via tentacle systems or chains, whereby a plurality of ligands can be bound to each chain or each tentacle system.

To increase the capacity of ion exchanger membranes in particular, there are various methods known per se that can be used to increase the number of substance-specific groups, i.e., of ligands on the surface of the membrane. Preferably, the ligands are coupled to the membrane via molecules of long-chain linear polymers, whereby the molecules of the long-chain linear polymers carry a plurality of ligands. The use of long-chain linear polymers with side arms, so-called tentacles, where the ligands are present on the tentacles, is described, for example, by W.

Muller, J. Chromatogr., Vol. 510 (1990), p. 133.

The production of such tentacles is described, for example, in Tsuneda et al. (Biotechnol. Prog., Vol. 10 (1994), pp. 76–81, and J. Chromatogr., Vol. A 689 (1995), pp. 211–218), and can take place via radiation-induced graft polymerization of a monomer containing an epoxy group, such as glycidyl methacrylate, with subsequent chemical conversion into $SO_3H$ groups or diethylamino groups. Another method for grafting of nitrogenous polymeric flat membranes that can be used to increase the ion exchanger capacity of the membrane treatment elements of the invention is described in EP-A-0 490 940.

Membranes containing polyamides derivatized with polymerizable double bonds, in accordance with DE-OS-195 01 726, are well suited for the apparatus of the invention or for conducting the process of the invention. These derivatized polyamides can be obtained by converting the polyamide in an aqueous solution with a compound containing both a polymerizable double bond and an oxirane ring, and they can be converted to block polymers with improved properties.

For applications in the field of enzymatic or general catalytic treatment of liquids, membranes can be selected on and/or in which enzymes or catalysts have been immobilized using methods known per se.

Applications in the field of enzymatic fluid treatment are, for example, enzymatic esterification of ethylene glycoside, enzymatic hydrolysis of starch via amyloglucosidase, enzymatic hydrolysis of enantiomers, plant oils, animal oils such as fish oil, or triglycerides via lipases, enzymatic decomposition of proteins via proteinases, lactose decomposition in milk via lactase, and decomposition of blood components via corresponding enzymes, such as urea via urease. Applications cited in U.S. Pat. No. 4,061,141 are also included herein. Other enzymes and their use and immobilization possibilities are described in Ullmann's Enzyklopadie der technischen Chemie (Encyclopedia of Industrial Chemistry), 4th Ed., Vol. 10, pp. 475–561, Verlag Chemie, Weinheim 1975. Data concerning catalysts and their immobilization in membrane structures, and their use in the framework of the present invention, can be found in U.S. Pat. No. 4,266,026, for example.

In the context of the invention, the cavities of flat-membrane treatment elements in particular can also be filled, partially or completely, with functional carriers without dispensing with the collection or distribution function for the fluid stream. In the simple case, such functional carriers can, as previously mentioned, be present in the form of a fluid-permeable nonwoven, for example, and be used solely as a spacer. However, nonwovens can be used in which particles have also been introduced that in turn carry substance-specific groups such as in the form of ligands or enzymes. Other examples are woven fabrics or nonwovens containing activated charcoal or activated charcoal by itself.

BRIEF DESCRIPTION OF THE DRAWINGS

In the following, the invention will be explained in more detail on the basis of the drawings, in simplified schematic representation:

FIG. 1 shows a treatment element pair made from appropriately dimensioned segments of hollow-fiber membranes, consisting of a first treatment element 1 and a second treatment element 2.

Figure 1:
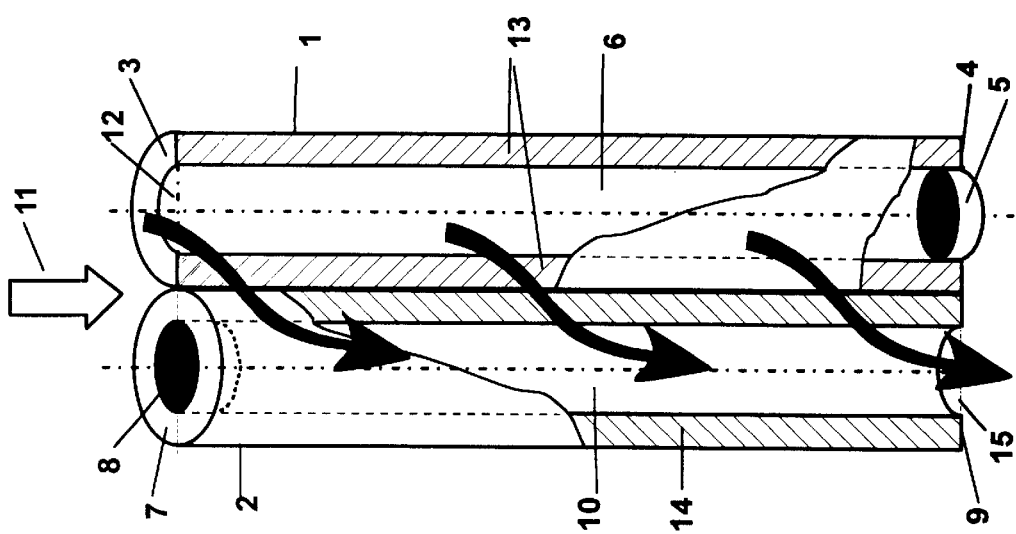
FIG. 1 shows a treatment element pair made from hollow-fiber membranes.

The two treatment elements are in direct contact with one another, in order to produce a high filling ratio $\epsilon$ in a stage of such treatment elements. The hollow-fiber membrane segment forming the first treatment element 1 is open at the end toward the inlet arrangement, which represents the end of treatment element 1 open toward the inlet arrangement. At its end 4 toward the outlet arrangement, the hollow-fiber membrane segment is sealed off by a plug 5, comprising an adhesive, for example, thus forming the closed end of treatment element 1 pointing toward the outlet arrangement. The lumen of the hollow-fiber membrane creates a cavity 6 open toward the inlet arrangement. The hollow-fiber membrane segment forming the second treatment element 2 is sealed off by a plug 8 at its end 7 pointing toward the inlet arrangement and open at its end 9 pointing toward the outlet arrangement, so that a cavity 10 open toward the outlet arrangement is formed. The flow toward the treatment element pair is indicated by arrow 11. The fluid to be treated flows from the direction of the inlet arrangement toward the treatment elements. Sealing off of one end of the hollow-fiber membrane segments can also be accomplished by heat sealing rather than by a plug.

The fluid to be treated flows from the distribution space adjacent to the treatment elements through the cavity opening 12 into cavity 6 of the first treatment element 1, through the porous membrane wall 13 of the first treatment element 1 and then exits via the porous membrane wall 14 of the second treatment element 2 into cavity 10 of the second treatment element 2. During the flow into the membrane walls 13, 14 and/or through them, the substance-specific treatments of the fluid take place. Via cavity opening 15 of the second treatment element 2, the fluid, having been treated in a substance-specific manner, exits the second treatment element in the direction of the outlet arrangement and enters the collection space adjacent to the treatment elements.

Figure 2:
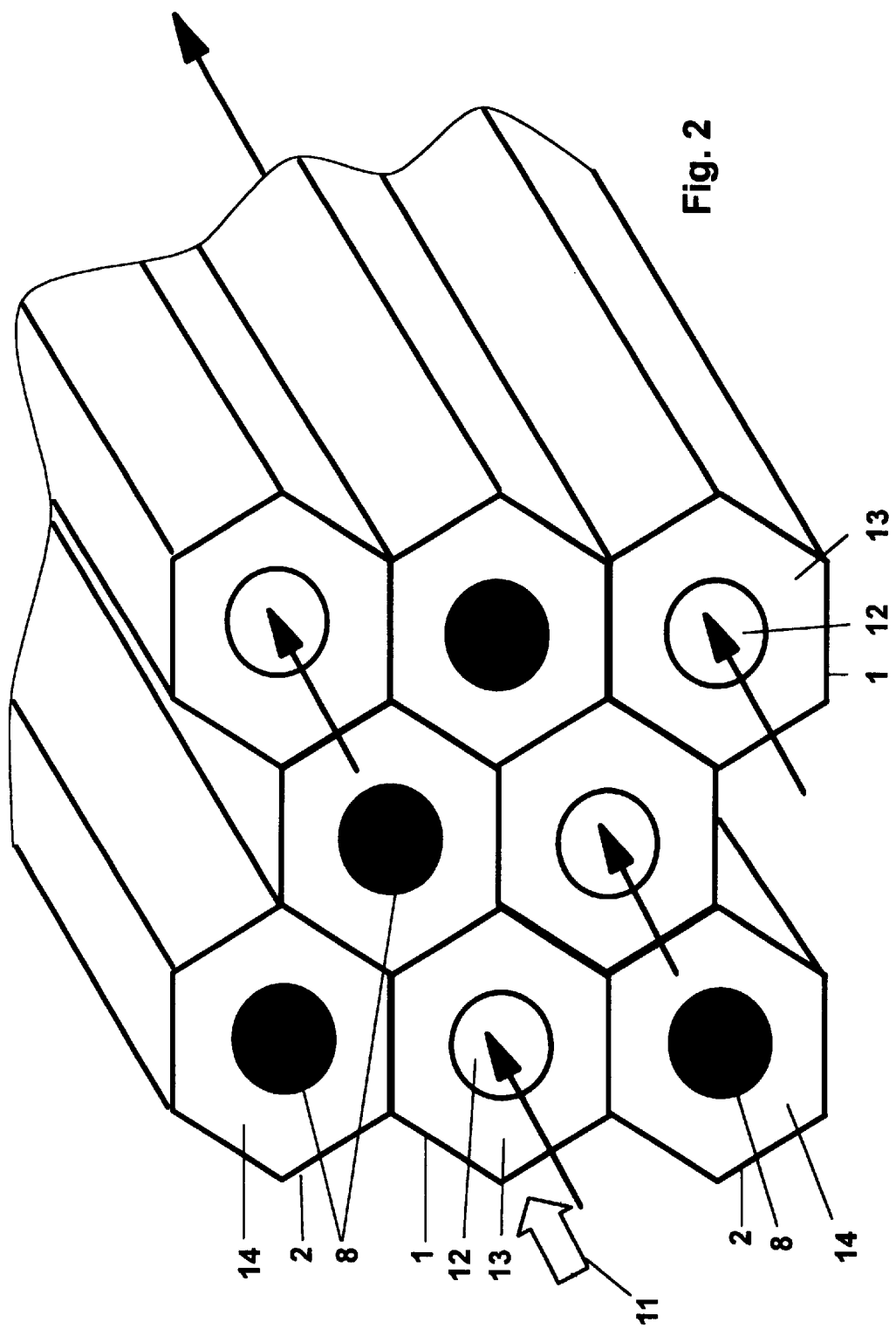
FIG. 2 shows a section of a high-filling-ratio arrangement of treatment elements made from hollow-fiber membranes with hexagonal contour.

FIG. 2 shows a section through an arrangement of treatment elements made from hollow-fiber membranes. The hollow-fiber membranes have a hexagonal contour and are thus adjacently arranged such that a dense packing with a filling ratio approaching 1 is generated. Such an arrangement of treatment elements made from hollow-fiber membranes can be generated, as a first approximation, by arranging hollow-fiber membranes with a round contour, in highly dense packing, adjacent to one another as a group in a housing and then using a swelling process to cause an expansion of the hollow-fiber membranes, whereby the wedge areas initially existing between the hollow-fiber membranes are largely filled in.

In such an arrangement, hollow-fiber membranes dimensioned with appropriate length, whose one end has been sealed, are combined with each other in such a way that, when viewing them from the ends of the group of treatment elements generated, as illustrated, elements with closed ends and elements with open ends are adjacent. On flow of the fluid to be treated toward such a group of treatment elements from the end region, the direction of flow again being represented by arrow 11, the hollow-fiber membrane elements whose cavities have an opening 12 in the direction from which the flow is directed and are closed at the other end become first treatment elements 1, and those whose cavities have a plug 8 in the direction from which the flow is directed and are open at the other end become second treatment elements 2.

Such arrangements can be made in a simple manner, for example, from mats of parallel-arranged hollow-fiber membranes whose one end is sealed off. Appropriately dimensioned sections of such mats are stacked in layers such that the closed ends of the hollow fibers of adjacent layers lie on opposite sides of the stack.

In this case as well, the fluid to be treated flows through the openings 12 of the cavities of the first treatment elements 1 into these cavities, through the porous walls 13, 14 of the first and adjacent second treatment elements 1, 2, at which point the substance-specific treatment of the fluid occurs, and then collects in the cavities of the second treatment elements 2, from which it flows via the latter's openings on the down-stream side and thus in the direction of the outlet arrangement.

Figure 3:
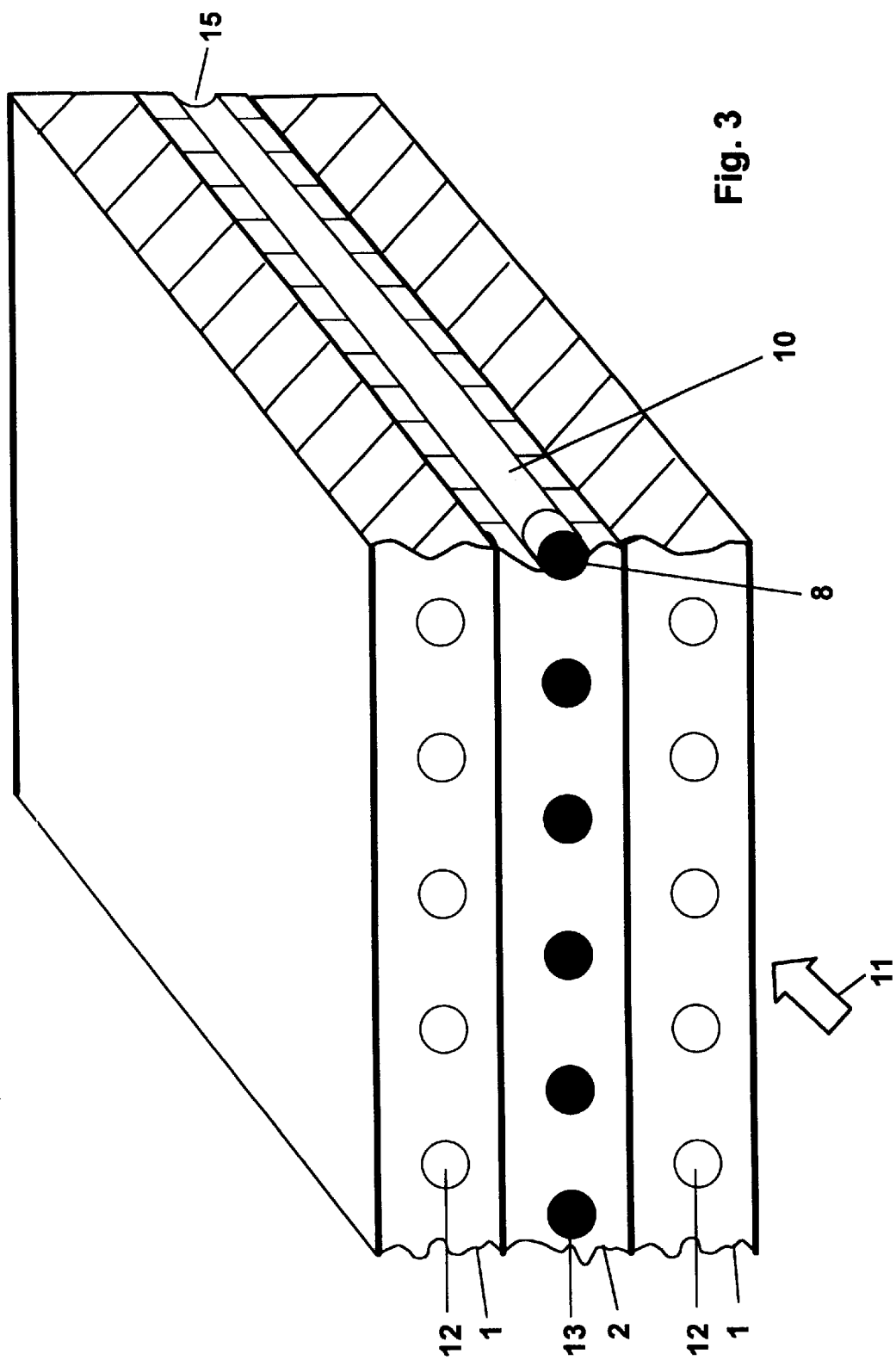
FIG. 3 shows a stack of first and second treatment elements made from membrane hollow-fiber chains.

FIG. 3 shows an example of the construction of a group of treatment elements made from membrane hollow-fiber chains. Such chains can be spun from an appropriately designed nozzle and have a plurality of continuous cavities arranged parallel to each other and along the hollow-fiber axis. In FIG. 3, segments of membrane hollow-fiber chains with rectangular external contour are shown.

From such membrane hollow-fiber chains, groups of first and second treatment elements can be formed in a simple manner by stacking hollow-fiber-chain segments of appropriate length, whose one end has been sealed off by adhesive or heat sealing means, for example, such that the closed ends of adjacent hollow-fiber chains in the stack lie alternately on opposite sides of the stack.

In FIG. 3, two membrane hollow-fiber chains are shown as first treatment elements 1, whose cavities have an opening 12 in the direction 11 from which flow of the fluid to be treated takes place. Between these two first treatment elements 1 is a membrane hollow-fiber chain as a second treatment element 2, whose cavities 10 are sealed off by plugs 8 at the end to which the flow 11 of the fluid to be treated is directed and which have an opening 15 at the opposite end.

Figure 4:
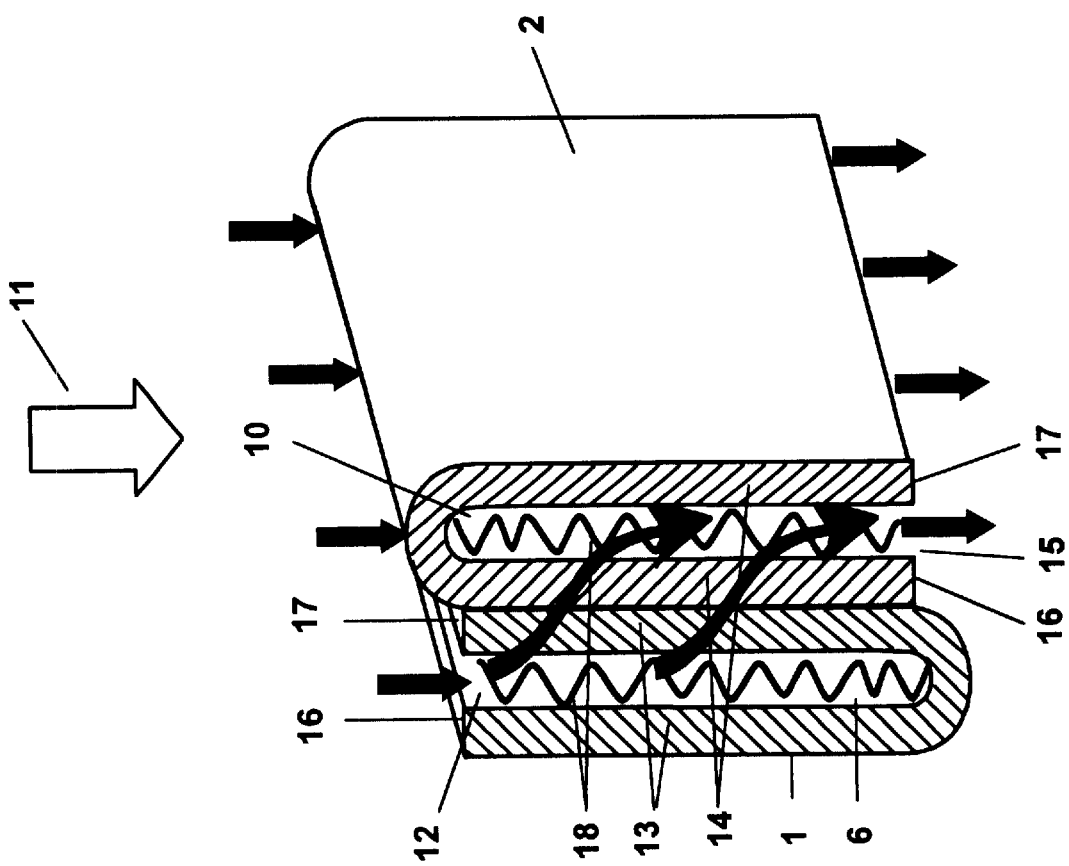
FIG. 4 shows a pair of planar treatment elements made from flat membranes folded in a U-shape.

FIG. 4 shows a pair of planar treatment elements made from flat membranes with a first treatment element 1 and a second treatment element 2. Such treatment elements can be generated by U-shaped folding of square or rectangular sections of flat membranes, for example. The flanks 16 and 17 of the folded flat membranes are held at a distance from one another by spacer is 18, for example in the form of a fluid-permeable nonwoven element. The cavities 6, 10 of the treatment elements are delimited by the flanks 16, 17 of the flat membrane elements, the folded edges, and the side edges joined together—not illustrated here—and have openings 12, 15 on the side opposite the folded edges. In the illustration of FIG. 4, the two flat membrane elements are arranged next to each other such that their adjacent flanks are in contact on the outside. In this manner, high filling ratios $\epsilon$ can be realized, and leakage streams, which would be produced in intermediate spaces that might exist between the treatment elements, can be minimized.

During use, the stream of fluid to be treated, represented by arrow 11, flows from the distribution space adjacent to the treatment elements through opening 12 of the first treatment element 1 into its cavity 6, through the porous membrane wall 13 of the first treatment element 1, and then exits via the porous membrane wall 14 of the second treatment element 2 into its cavity 10. Depending on the application, the substance-specific treatment of the fluid occurs during the flow into the membrane walls 13, 14 and/or the flow through these walls. Via cavity opening 15, the fluid after substance-specific treatment leaves the second treatment element and enters the adjacent collection space.

Figure 5:
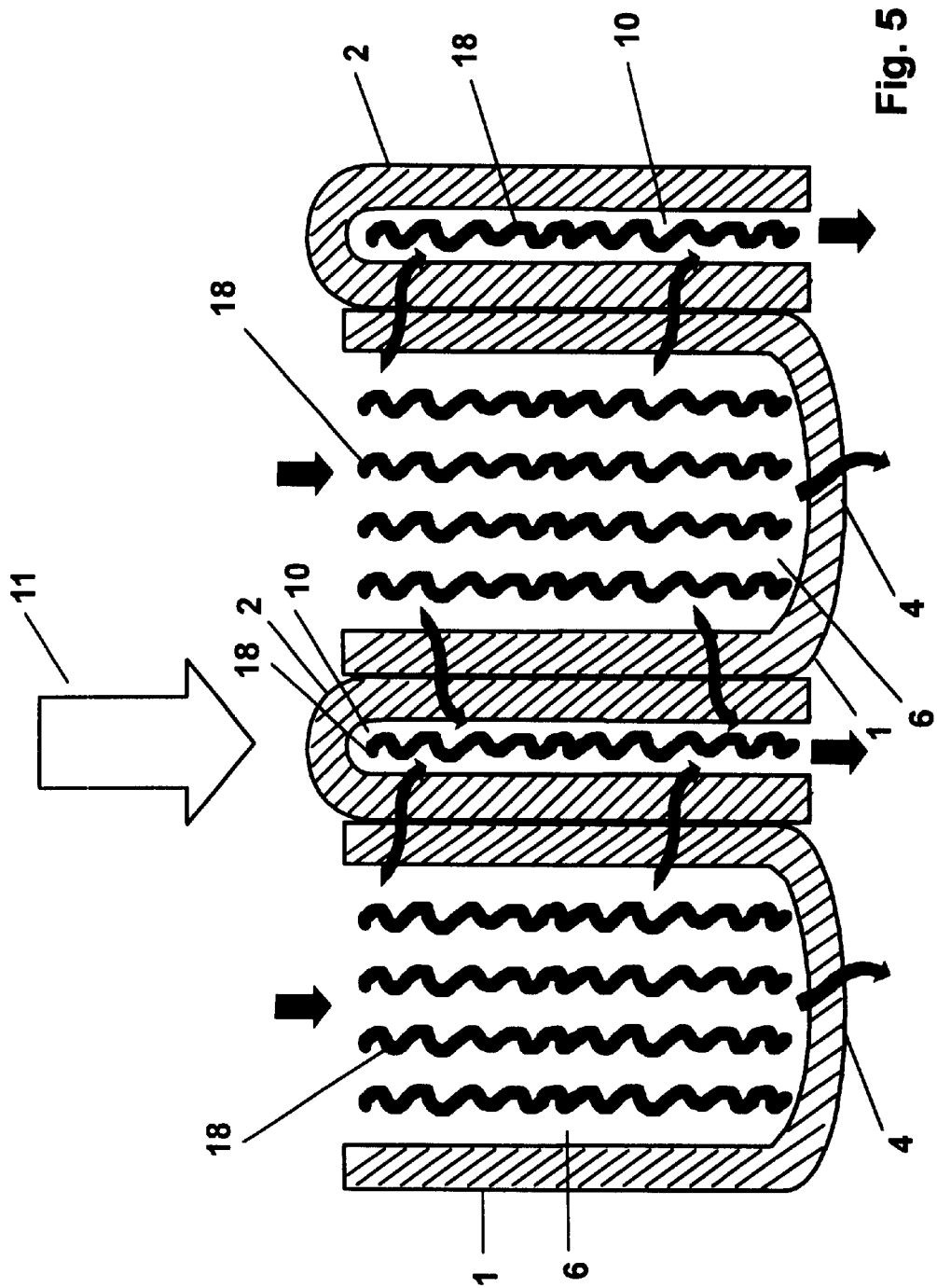
FIG. 5 shows a group of first and second treatment elements for substance-specific treatment of suspensions.

In FIG. 5, an arrangement of treatment elements is illustrated that can be used for the substance-specific treatment of suspensions, for example. Planar treatment elements made from flat-membrane sections folded or arched in a U-shape are combined into a group of first and second treatment elements arranged next to each other. The cavities 6 of the first treatment elements 1 are in this example of FIG. 5 dimensioned larger than the cavities 10 of the second treatment elements 2, whereby the cavities are stabilized with spacers 18 of appropriate width. Such an enlargement of cavities 6 of the first treatment elements 1 is practical when, for example, in the substance-specific treatment of suspensions, the suspended particles are to be initially filtered off as a target substance in the first treatment elements before the filtrate, containing additional target substances, is subjected to additional substance-specific treatments in the membrane walls of the first and/or second treatment elements. Of course, during the substance-specific treatment of the fluid, the retained particles collect in the cavities 6 of the first treatment elements, requiring these cavities to have a certain capacity and thus a certain size.

Otherwise, the material streams flowing through this arrangement correspond to those already described for the treatment element in FIG. 4. For the embodiment shown in FIG. 5, however, increased material flow exiting the first treatment elements 1 at their closed end 4 is to be expected due to the larger cross-sections of the cavities 6. This material stream can then be subjected to further substance-specific treatments only in a subsequent stage, if any, of treatment elements.

Figure 6:
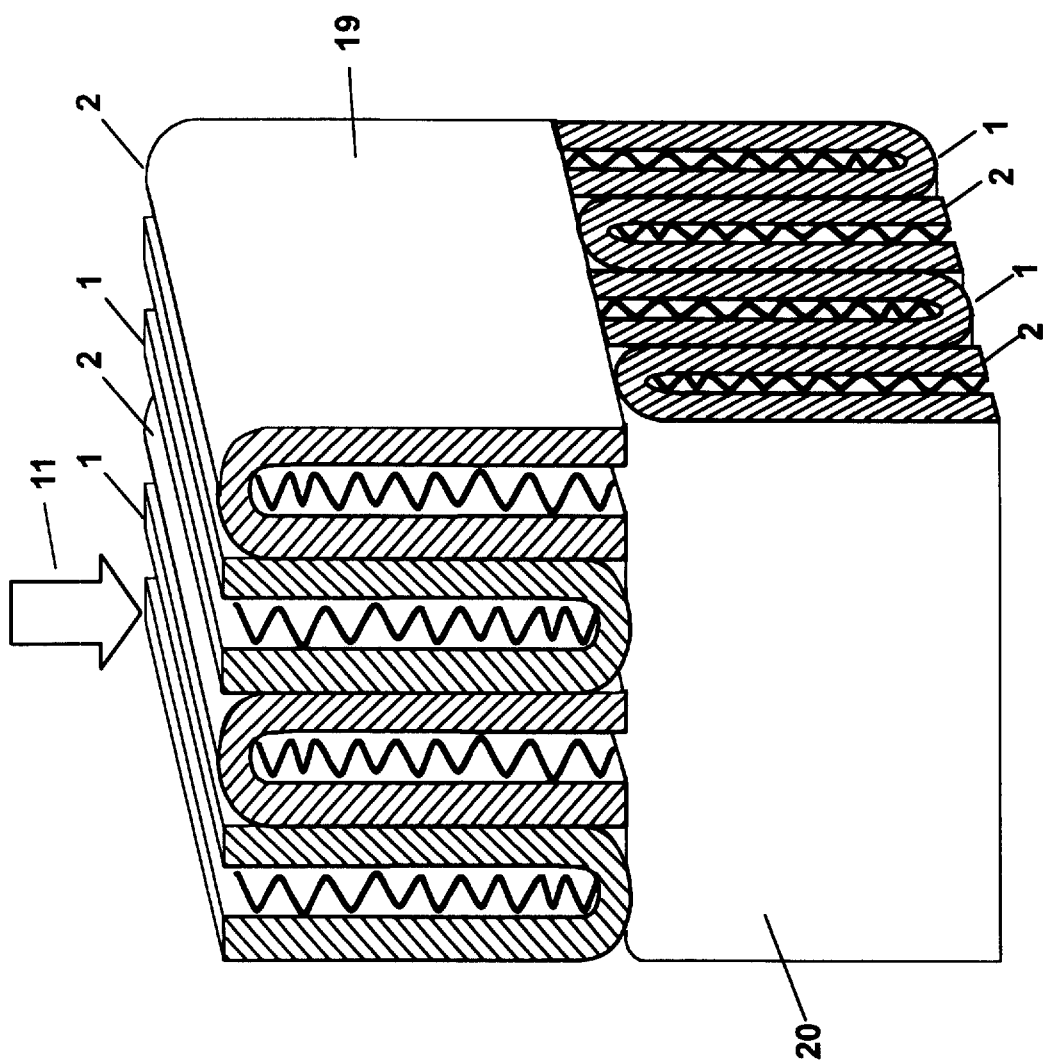
FIG. 6 shows stages of stacks, oriented 90° to each other, of planar flat-membrane treatment elements.

FIG. 6 shows two consecutive stages 19, 20 of groups of first and second planar treatment elements 1, 2 that are made from flat membranes folded in a U-shape and arranged adjacent to each other pairwise in stack form. The treatment elements are stacked adjacently such that the intermediate spaces between the treatment elements, and thus any leakage streams that might occur, are minimized. In the example illustrated in this figure, the folded edges of the treatment elements of the adjacent stages 19, 20 are positioned at 90° to one another. In this manner, covering of the openings of the first treatment elements of the respective follow-on stage is largely avoided and a better flow distribution is attained between the stages.

Figure 7:
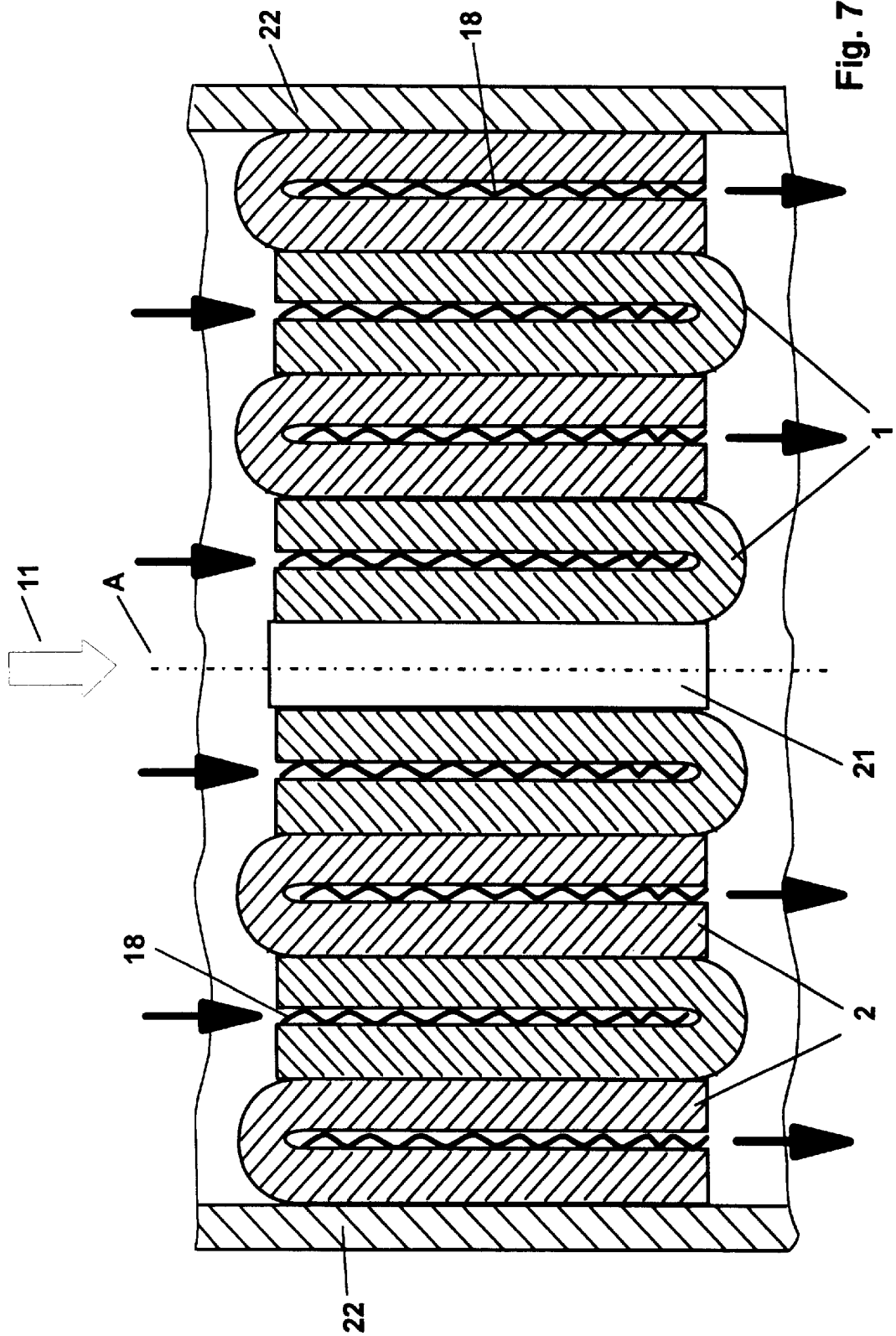
FIG. 7 shows a treatment element pair made from flat membranes folded in a U-shape, the pair wound spirally around a core.

With planar treatment elements made from flat membranes, as shown in FIG. 4, groups of first and second treatment elements can, in addition to adjacent stacking, also be generated by spirally winding appropriately dimensioned flat membrane sections, folded in a U-shape, for example. FIG. 7 shows a section through such a group of one first and one second treatment element 1, 2 wound spirally around a core 21, the group being positioned between the housing walls 22. To produce such a group, for example, two flat membrane sections folded in a U-shape and with appropriate length along the folded edges are superimposed such that the folded edges lie on opposite sides. This treatment-element pair is then wound spirally around a core 21, resulting in multiple layers of treatment elements and, in the section illustrated, in an alternating sequence from the inside outward with respect to the direction in which the cavities of the treatment elements open.

In accordance with FIG. 7, this spiral shaped group of first and second treatment elements is inserted into a housing, for practical reasons with round cross-section, such that the winding axis A and the housing axis coincide or are at least essentially parallel. For this purpose, it is advantageous to compress the circumference of the spiral somewhat before inserting the spiral-shaped group of treatment elements into the housing, which is readily possible by elastic deformation of the spacers 18 that stabilize the cavities, for example. After insertion into the housing, the spiral-shaped group of treatment elements remains subject to a certain residual tension between the winding core 21 and the housing wall 22, ensuring on the one hand pressure between the contacting flanks of the treatment elements, thus minimizing intermediate spaces between the treatment elements, and on the other hand stable positioning of the treatment elements in the housing. Through the arrangement of the group in the housing, there is an automatic association as first treatment elements 1 and second treatment elements 2, given the direction of flow 11.

Using such spirally wound treatment elements, high filling ratios ε can be attained in a simple manner when using winding cores, and at the same time leakage streams between the treatment elements are avoided to the greatest possible extent.

Figure 8:
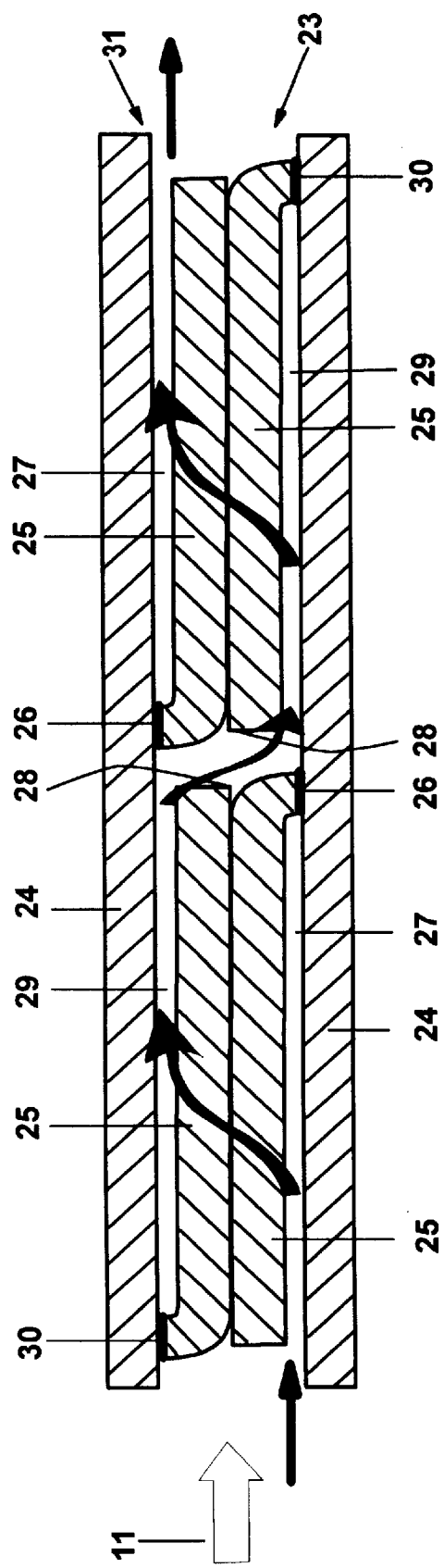
FIG. 8 shows a pairwise arrangement of treatment-element units made from flat membranes with a plurality of sequentially arranged pairs of treatment elements.

FIG. 8 shows an embodiment of the treatment elements that is likewise based on flat membranes. In this case, multiple sequentially arranged treatment elements are combined to form treatment-element units, whereby in FIG. 8 a combination of two such treatment-element units, each with two sequentially arranged treatment elements, is illustrated. At the same time, fluid-impermeable films are combined with flat membranes.

To produce such a treatment-element unit 23, preferably square or rectangular sections of a fluid-impermeable film 24 and a flat membrane 25, approximately equal in size, are superimposed, whereby a spacer—not illustrated in FIG. 8—in the form of a nonwoven has been inserted between the film and membrane to provide subsequent stabilization of the cavities of the treatment elements. To produce the treatment-element unit 23 with two sequentially arranged treatment elements, as shown in FIG. 8, the flat membrane 25 and possibly the spacer are cut along a line parallel to the edges of the foil and membrane sections that, after the unit is constructed, will lie perpendicular to the direction of flow. The one cut edge 26 of flat membrane 25 is then positively joined with film 24, such as by heat sealing or adhesive means. This results in a treatment element 27 with a cavity open on one side. The second cut edge 28, together with film 24, forms the opening of the cavity of the adjacent treatment element 29, the other end of the cavity being closed by positively joining the free membrane edge 30 to the film 24.

Such a treatment-element unit 23 is combined with a second treatment-element unit 31, identical in design to the first unit but inverted with respect to it, such that pairs of first and second treatment elements are generated that are sequential with respect to the direction of flow 11 of a fluid to be treated. In this manner, in such a combination of treatment-element units according to FIG. 8, two stages of treatment elements are realized, through which the fluid to be treated flows in a meandering fashion.

Larger treatment units can be generated from such combined pairs of treatment-element units, which can also have more than two sequentially arranged pairs of treatment elements, by stacking multiple such pairs of treatment-element units adjacent to each other or by winding at least one such pair spirally around an axis or a core perpendicular to the cut edges generated when constructing the treatment elements.

Figure 9:
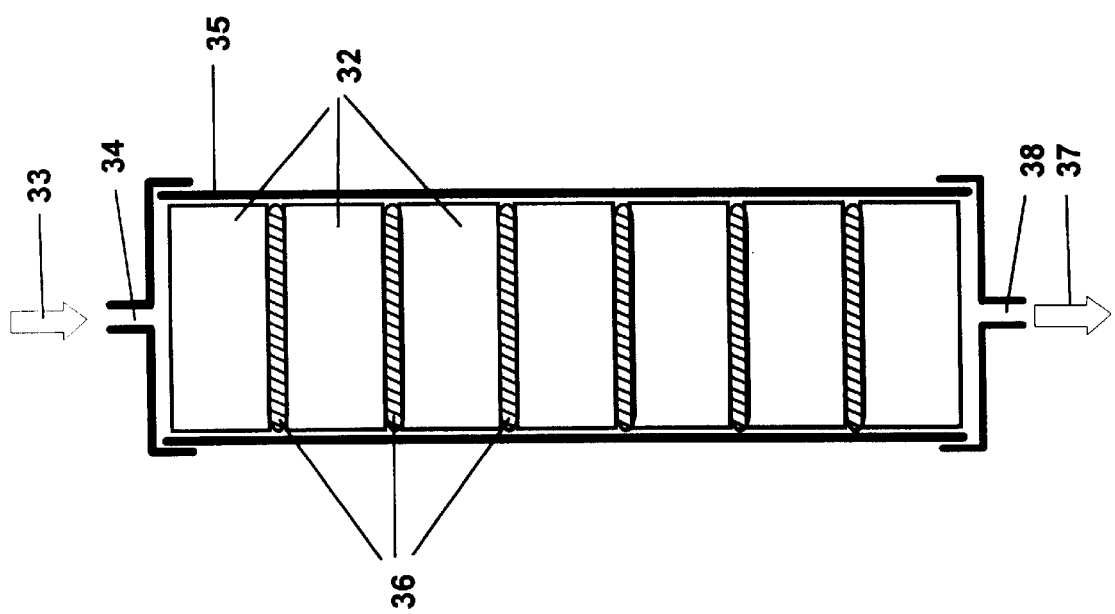
FIG. 9 shows a cross-section through an apparatus of the invention.

In FIG. 9, an apparatus of the invention is illustrated schematically in cross-section, containing multiple stages 32 of first and second treatment elements. The fluid 33 to be treated enters the housing 35 of the apparatus of the invention as a feed stream through the inlet arrangement 34 and is distributed uniformly to the treatment elements of the first stage, possibly supported by an appropriately designed distribution arrangement, which is not illustrated. The fluid then passes through the stages 32 of treatment elements in the housing in sequence, in which the substance-specific treatment or treatments of the fluid take place. According to FIG. 9, adjacent stages 32 in the apparatus of the invention are spaced from one another. The resulting intermediate spaces between the individual stages, which constitute collection space for the preceding stage and at the same time distribution space for the following stage, are filled with spacers 36 in the form of fluid-permeable nonwovens, for example, allowing better intermixing of the fluid stream leaving a stage and at the same time increased stability of the position of the individual stages of treatment elements in the housing. After passing through the required number of stages 32, the treated fluid 37 is removed from the housing via the outlet arrangement 38.

What is claimed is:

1. An apparatus for substance-specific treatment of a fluid (33), including
   a) a housing (35),
   b) an inlet arrangement (34) for introducing the fluid (33) to be treated into the housing (35),
   c) an outlet arrangement (38) for removing the treated fluid (37) from the housing (35),
   d) at least one first treatment element (1) and at least one second treatment element (2) for substance-specific treatment of the fluid, whereby each treatment element has an end (3, 7) pointing toward the inlet arrangement (34) and an end (4, 9) pointing toward the outlet arrangement (38) whereby the ends of the treatment elements are not embedded in an embedding,
   whereby the at least one first treatment element (1) has at least one cavity (6) formed by its walls (13), open toward the inlet arrangement (34) and closed toward the outlet arrangement (38), and the at least one second treatment element (2) has at least one cavity (10) formed by its walls (14), open toward the outlet arrangement (38) and closed toward the inlet arrangement (34), characterized in that the treatment elements (1, 2) are combined to form at least one group of treatment elements, comprising at least one first and at least one second treatment elements, the treatment elements within the group are adjacent to each other in a direction substantially perpendicular to the extent of the housing (35) between the inlet arrangement (34) and the outlet arrangement (38),
   wherein the walls (13) of each of the at least one first treatment element (1) and the walls (14) of each of the at least one second treatment element (2) each comprise a membrane at least in part formed from one single-layered semi-permeable membrane with a porous structure, such that the walls (13) of each of the at least one first treatment element are capable of providing a first substance-specific treatment of fluid passing there through and the walls (14) of each of the at least one second treatment element are capable of providing in sequence another substance-specific treatment of fluid passing there through, wherein the membrane is a hollow-fiber membrane, the wall (13, 14) of the hollow-fiber membrane is the wall of the at least one cavity (6, 10), and the hollow-fiber membrane is closed at one end (4, 7), and wherein the hollow-fiber membranes of a group of adjacent treatment elements are bound using textile threads into at least one hollow-fiber mat, with the hollow-fiber membranes essentially parallel to one another.

2. The apparatus according to claim 1, wherein at least one group of treatment elements (1,2) defining at least one stage (32) is arranged in the housing (35) in a direction taken by the housing (35) between the inlet arrangement (34) and outlet arrangement (38).

3. The apparatus according to claim 2, characterized in that the at least one stage (32) comprises any number of stages from 1 to 10.

4. The apparatus according to claim 1, characterized in that the at least one treatment element has a ratio $V_w/V_t$ of the volume of its walls $V_w$ to a volume $V_t$ comprising the volume of the walls $V_w$ and a volume $V_c$ of its at least one cavity between 0.4 and 0.9, where $V_w$, $V_c$, and $V_t$ refer to the wall, cavity and total volumes, respectively, of an individual treatment element.

5. The apparatus according to claim 1, characterized in that at least one cavity has a dimensional ratio L/D of its dimensions L in a direction taken by the housing (35) between the inlet arrangement (34) and outlet arrangement (38) to a hydraulic diameter D of its cross-section perpendicular thereto of between 2 and 4000.

6. The apparatus according to claim 1, characterized in that the membrane has a BET surface area between 2 and 300 $m^2$ per $cm^3$ of membrane volume.

7. The apparatus according to claim 1 characterized in that the hollow-fiber membranes with cavities (6,10) open on one side are bound in the at least one hollow-fiber mat such that the openings (12,15) of the cavities (6,10) of adjacent hollow-fiber membranes are arranged on opposite sides of the hollow-fiber mat.

8. The apparatus according to claim 7, characterized in that at least one hollow-fiber mat is wound spirally around a winding axis essentially parallel to the hollow-fiber membranes and to the direction taken by the housing (35) between the inlet arrangement (34) and outlet arrangement (38).

9. The apparatus according to claim 7, characterized in that a plurality of hollow-fiber mats are superimposed to form stack of individual mat layers or folded mat layers, whereby the hollow-fiber membranes in the stack are arranged parallel to each other.

10. The apparatus according to claim 1, characterized in that the hollow-fiber membranes with cavities open on one side are bound in the at least one hollow-fiber mat such that the openings of all cavities are arranged on the same side of the at least one hollow-fiber mat.

11. The apparatus according to claim 10, characterized in that a plurality of hollow-fiber mats are superimposed as layers such that the closed ends of the hollow-fiber membranes alternate from layer to layer on opposite sides of the stack.

12. The apparatus according to claim 10, characterized by at least one pair of hollow-fiber mats, where first and second hollow-fiber mats of the at least one pair are superimposed such that the openings of the hollow-fiber membranes of the first mat and the openings of the hollow-fiber membranes of the second mat are on opposite sides and where the at least one pair is wound spirally around a winding axis essentially parallel to the hollow-fiber membranes and the direction taken by the housing (35) between the inlet arrangement (34) and outlet arrangement (38).

13. The apparatus according to claim 1, characterized in that the membrane is made from cellulose, polyamide, polytetrafluoroethylene, or polyvinylidene fluoride, or modifications, blends, mixtures, or copolymers thereof.

14. The apparatus according to claim 1, characterized in that groups acting in a substance-specific manner are immobilized on and/or in the membrane.

15. The apparatus according to claim 14, characterized in that the groups acting in a substance-specific manner are ligands for affinity separation of ligates from a liquid to be treated.

16. The apparatus according to claim 14, characterized in that the groups acting in a substance-specific manner are catalysts.

17. An apparat us for substance-specific treatment of a fluid (33), including
   a) a housing (35),
   b) an inlet arrangement (34) for introducing the fluid (33) to be treated into the housing (35),
   c) an outlet arrangement (38) for removing the treated fluid (37) from the housing (35),
   d) at least one first treatment element (1) and at least one second treatment element (2) for substance-specific treatment of the fluid, whereby each treatment element has an end (3, 7) pointing toward the inlet arrangement (34) and an end (4, 9) pointing toward the outlet arrangement (38) whereby the ends of the treatment elements are not embedded in an embedding, whereby the at least one first treatment element (1) has at least one cavity (6) formed by its walls (13), open toward the inlet arrangement (34) and closed toward the outlet arrangement (38), and the at least one second treatment element (2) has at least one cavity (10) formed by its walls (14), open toward the outlet arrangement (38) and closed toward the inlet arrangement (34), characterized in that the treatment elements (1, 2) are combined to form at least one group of treatment elements, comprising at least one first and at least one second treatment elements, the treatment elements within the group are adjacent to each other in a direction substantially perpendicular to the extent of the housing (35) between the inlet arrangement (34) and the outlet arrangement (38), wherein the walls (13) of each of the at least one first treatment element (1) and the walls (14) of each of the at least one second treatment element (2) each comprise a membrane at least in part formed from one single-layered semi-permeable membrane with a porous structure, such that the walls (13) of each of the at least one first treatment element are capable of providing a first substance-specific treatment of fluid passing there through and the walls (14) of each of the at least one second treatment element are capable of providing in sequence another substance-specific treatment of fluid passing there through, wherein each of the treatment elements (1,2) is formed from at least one flat membrane, and wherein the treatment elements (1, 2) are formed from flat membranes folded in a U-shape, whereby a closed folded edge is formed and flanks are formed by the folding of each flat membrane, where the flanks (16, 17) of each flat membrane folded in a U-shape are held at a distance by spacers (18) for forming the cavity (6, 10), whereby the closed folded edge is arranged in the direction of the outlet arrangement (38) for first treatment elements (1) and the closed folded edge is arranged in the direction of the inlet arrangement (34) for second treatment elements (2).

18. The apparatus according to claim 17, characterized in that the treatment elements (1,2) are arranged in flat form next to each other into stacks with an alternating sequence of first and second treatment elements.

19. The apparatus according to claim 17, characterized in that at least one pair of a first treatment element (1) and a second treatment element (2) is wound spirally around a winding axis (A) perpendicular to the closed folded edge and essentially parallel to a direction taken by the housing (35) between the inlet arrangement (34) and outlet arrangement (35).

20. The apparatus according to claim 17, characterized in that the membrane is made from cellulose, polyamide, polytetrafluoroethylene, or polyvinylidene fluoride, or modifications, blends, mixtures, or copolymers thereof.

21. The apparatus according to claim 17, characterized in that groups acting in a substance-specific manner are immobilized on and or in the membrane.

22. The apparatus according to claim 21, characterized in that the groups acting in a substance-specific manner are ligands for affinity separation of ligates from a liquid to be treated.

23. The apparatus according to claim 21, characterized in that the groups acting in a substance-specific manner are catalysts.

24. The apparatus according to claim 17, wherein at least one group of treatment elements (1,2) defining at least one stage (32) is arranged in the housing (35) in a direction taken by the housing (35) between the inlet arrangement (34) and outlet arrangement (38).

25. The apparatus according to claim 24, characterized in that the at least one stage (32) comprises any number of stages from 1 to 10.

26. The apparatus according to claim 17, characterized in that the at least one treatment element has a ratio $V_w/V_t$ of a volume of its walls $V_w$ to a volume $V_t$ comprising the volume of the walls $V_w$ and a volume $V_c$ of its at least one cavity between 0.4 and 0.9, where $V_w$, $V_c$, and $V_t$ refer to the wall, cavity and total volumes, respectively, of an individual treatment element.

27. The apparatus according to claim 17, characterized in that the membrane has a BET surface area between 2 and 300 m$^2$ per cm$^3$ of membrane volume.

28. An apparatus for substance-specific treatment of a fluid (33), including
 a) a housing (35),
 b) an inlet arrangement (34) for introducing the fluid (33) to be treated into the housing (35),
 c) an outlet arrangement (38) for removing the treated fluid (37) from the housing (35),
 d) at least one first treatment element (1) and at least one second treatment element (2) for substance-specific treatment of the fluid, whereby each treatment element has an end (3, 7) pointing toward the inlet arrangement (34) and an end (4, 9) pointing toward the outlet arrangement (38) whereby the ends of the treatment elements are not embedded in an embedding,
 whereby the at least one first treatment element (1) has at least one cavity (6) formed by its walls (13), open toward the inlet arrangement (34) and closed toward the outlet arrangement (38), and the at least one second treatment element (2) has at least one cavity (10) formed by its walls (14), open toward the outlet arrangement (38) and closed toward the inlet arrangement (34), characterized in that the treatment elements (1, 2) are combined to form at least one group of treatment elements, comprising at least one first and at least one second treatment elements, the treatment elements within the group are adjacent to each other in a direction substantially perpendicular to the extent of the housing (35) between the inlet arrangement (34) and the outlet arrangement (38), wherein the walls (13) of each of the at least one first treatment element (1) and the walls (14) of each of the at least one second treatment element (2) each comprise a membrane at least in part formed from one single-layered semi-permeable membrane with a porous structure, such that the walls (13) of each of the at least one first treatment element are capable of providing a first substance-specific treatment of fluid passing there through and the walls (14) of each of the at least one second treatment element are capable of providing in sequence another substance-specific treatment of fluid passing there through, wherein each of the treatment elements (1,2) is formed from at least one flat membrane, wherein the treatment elements (1,2) are formed from two equally sized flat membranes, spaced from one another by spacers (18) and essentially parallel to each other, that are arranged such that a plurality of four edges of each flat membrane run parallel atop each other and are positively joined at one edge, whereby the positively joined edge in the case of first treatment elements (1) is arranged toward the outlet arrangement (38) and the positively joined edge in the case of second treatment elements (2) is arranged in the direction of the inlet arrangement (34), and wherein the treatment elements (1, 2) are formed from a flat membrane (25) and a fluid-impermeable film (24).

29. The apparatus according to claim 28, characterized in that the treatment elements (1,2) are arranged in flat form next to each other into stacks with an alternating sequence of first and second treatment elements.

30. The apparatus according to claim 28, characterized in that at least one pair of a first treatment element (1) and a second treatment element (2) is wound spirally around winding axis (A) perpendicular to the positively joined edge and essentially parallel to a direction taken by the housing (35) between the inlet arrangement (34) and outlet arrangement (35).

31. Process for cleaning/separation of ligates from a ligate-containing liquid by affinity, characterized in that at least one membrane is used on and/or in which ligands for said ligates are immobilized, and the process is conducted by the steps of:
 I. using an apparatus for substance-specific treatment of a fluid (33), including
  a) a housing (35),
  b) an inlet arrangement (34) for introducing the fluid (33) to be treated into the housing (35),
  c) an outlet arrangement (38) for removing the treated fluid (37) from in the housing (35),
  d) at least one first treatment element (1) and at least one second treatment element (2) for substance-specific treatment of the fluid, whereby each treatment element has an end (3, 7) pointing toward the inlet arrangement (34) and an end (4, 9) pointing toward the outlet arrangement (38) whereby the ends of the treatment elements are not embedded in an embedding, whereby the at least one first treatment element (1) has at least one cavity (6) formed by its walls (13), open toward the inlet arrangement (34) and closed toward the outlet arrangement (38), and the at least one second treatment element (2) has at least one cavity (10) formed by its walls (14), open toward the outlet arrangement (38) and closed toward the inlet arrangement (34), characterized in that the treatment elements (1, 2) are combined to form at least one group of treatment elements, comprising at least one first and at least one second treatment elements, the treatment elements within the group are adjacent to each other in a direction substantially perpendicular to the extent of the housing (35) between the inlet arrangement (34) and the outlet arrangement (38), and wherein the walls (13) of each of the at least one first treatment element (1) and the walls (14) of each of the at least one second treatment element (2) each comprise a membrane at least in part formed from one single-layered semi-permeable membrane with a porous structure, such that the walls (13) of each of the at least one first treatment element are capable of providing a first substance-specific treatment of fluid passing there through and the walls (14) of each of the at least one second treatment element are capable of providing in sequence another substance-specific treatment of fluid passing there through; and II. a) introducing the fluid (33) to be treated via the inlet arrangement (34) of the housing (35), b) feeding of at least a portion of the fluid (33) to be treated into the cavity (6) of each of the at least one first treatment element (1) of a group of treatment elements (1, 2) and penetrating the walls (13) of the at least one first treatment element (1), whereby a substance specific treatment of the fluid takes place, the walls of the at least one first treatment element are at least in part one single-layered membrane, c) passing out of the fluid after substance-specific treatment from the walls (13) of each of the at least one first treatment elements (1), d) feeding of at least a portion of the fluid after substance-specific treatment in each of the at least one first treatment elements (1) into, and penetrating, the walls (14) of each of the at least one second treatment elements of the group, whereby another substance-specific treatment of the fluid penetrating the walls (14) of the at least one second treatment elements (2) takes place, the walls of the at least one second treatment element are at least in part one single-layered membrane, e) passing out of the fluid after substance-specific treatment in each of at least one of the second treatment elements (2) from each cavity (10) of the at least one second treatment elements (2), f) collecting the treated fluid, g) removing the treated fluid (37) via the outlet arrangement (38) of the housing (35).

32. The process according to claim 31, characterized in that steps II b) through II d) are performed multiple times.

33. The process according to claim 32, characterized in that the treatment of the fluid is conducted in a plurality of treatment elements (1,2) forming at least one group arranged as at least one stage (32) in a direction of flow through the housing (35).

34. The process according to claim 33, characterized in that the at least one stage (32) comprises any number of stages between 1 and 10.

35. The process according to claim 31, characterized in that the fluid to be treated is recirculated.

36. Process for catalytic treatment of fluids, characterized in that at least one membrane is used on and/or in which catalysts are immobilized and the process is conducted by the steps of:

I. using an apparatus for substance-specific treatment of a fluid (33), including a) a housing (35), b) an inlet arrangement (34) for introducing the fluid (33) to be treated into the housing (35), c) an outlet arrangement (38) for removing the treated fluid (37) from in the housing (35), d) at least one first treatment element (1) and at least one second treatment element (2) for substance-specific treatment of the fluid, whereby each treatment element has an end (3, 7) pointing toward the inlet arrangement (34) and an end (4, 9) pointing toward the outlet arrangement (38) whereby the ends of the treatment elements are not embedded in an embedding, whereby the at least one first treatment element (1) has at least one cavity (6) formed by its walls (13), open toward the inlet arrangement (34) and closed toward the outlet arrangement (38), and the at least one second treatment element (2) has at least one cavity (10) formed by its walls (14), open toward the outlet arrangement (38) and closed toward the inlet arrangement (34), characterized in that the treatment elements (1, 2) are combined to form at least one group of treatment elements, comprising at least one first and at least one second treatment elements, the treatment elements within the group are adjacent to each other in a direction substantially perpendicular to the extent of the housing (35) between the inlet arrangement (34) and the outlet arrangement (38), and wherein the walls (13) of each of the at least one first treatment element (1) and the walls (14) of each of the at least one second treatment element (2) each comprise a membrane at least in part formed from one single-layered semi-permeable membrane with a porous structure, such that the walls (13) of each of the at least one first treatment element are capable of providing a first substance-specific treatment of fluid passing therethrough and the walls (14) of each of the at least one second treatment element are capable of providing in sequence another substance-specific treatment of fluid passing therethrough; and II. a) introducing the fluid (33) to be treated via the inlet arrangement (34) of the housing (35), b) feeding of at least a portion of the fluid (33) to be treated into the cavity (6) of each of the at least one first treatment element (1) of a group of treatment elements (1, 2) and penetrating the walls (13) of the at least one first treatment element (1), whereby a substance specific treatment of the fluid takes place, the walls of the at least one first treatment element are at least in part one single-layered membrane, c) passing out of the fluid after substance-specific treatment from the walls (13) of each of the at least one first treatment elements (1), d) feeding of at least a portion of the fluid after substance-specific treatment in each of the at least one first treatment elements (1) into, and penetrating, the walls (14) of each of the at least one second treatment elements of the group, whereby another substance-specific treatment of the fluid penetrating the walls (14) of the at least one second treatment elements (2) takes place, the walls of the at least one second treatment element are at least in part one single-layered membrane, e) passing out of the fluid after substance-specific treatment in each of at least one of the second treatment elements (2) from each cavity (10) of the at least one second treatment elements (2), f) collecting the treated fluid, g) removing the treated fluid (37) via the outlet arrangement (38) of the housing (35).

37. The process according to claim 36, characterized in that steps II b) through II d) are performed multiple times.

38. The process according to claim 37, characterized in that the treatment of the fluid is conducted in a plurality of treatment elements (1,2) forming at least one group arranged as at least one stage (32) in a direction of flow through the housing (35).

39. The process according to claim 38, characterized in that the at least one stage (32) comprises any number between 1 and 10.

40. The process according to claim 36, characterized in that the fluid to be treated is recirculated.

41. An apparatus for substance-specific treatment of a fluid (33), including a) a housing (35), b) an inlet arrangement (34) for introducing the fluid (33) to be treated into the housing (35), c) an outlet arrangement (38) for removing the treated fluid (37) from the housing (35), d) at least one first treatment element (1) and at least one second treatment element (2) for substance-specific treatment of the fluid, whereby each treatment element has an end (3, 7) pointing toward the inlet arrangement (34) and an end (4, 9) pointing toward the outlet arrangement (38) whereby the ends of the treatment elements are not embedded in an embedding, whereby the at least one first treatment element (1) has at least one cavity (6) formed by its walls (13), open toward the inlet arrangement (34) and closed toward the outlet arrangement (38), and the at least one second treatment element (2) has at least one cavity (10) formed by its walls (14), open toward the outlet arrangement (38) and closed toward the inlet arrangement (34), characterized in that the treatment elements (1, 2) are combined to form at least one group of treatment elements, comprising at least one first and at least one second treatment elements, the treatment elements within the group are adjacent to each other in a direction substantially perpendicular to the extent of the housing (35) between the inlet arrangement (34) and the outlet arrangement (38), wherein the walls (13) of each of the at least one first treatment element (1) and the walls (14) of each of the at least one second treatment element (2) each comprise a membrane at least in part formed from one single-layered semi-permeable membrane with a porous structure, such that the walls (13) of each of the at least one first treatment element are capable of providing a first substance-specific treatment of fluid passing there through and the walls (14) of each of the at least one second treatment element are capable of providing in sequence another substance-specific treatment of fluid passing there through, wherein each of the treatment elements (1,2) is formed from at least one flat membrane, wherein the treatment elements (1,2) are formed from two equally sized flat membranes, spaced from one another by spacers (18) and essentially parallel to each other, that are arranged such that a plurality of four edges of each flat membrane run parallel atop each other and are positively joined at one edge, whereby the positively joined edge in the case of first treatment elements (1) is arranged toward the outlet arrangement (38) and the positively joined edge in the case of second treatment elements (2) is arranged in the direction of the inlet arrangement (34), and wherein at least one pair of a first treatment element (1) and a second treatment element (2) is wound spirally around winding axis (A) perpendicular to the positively joined edges and essentially parallel to the direction taken by the housing (35) between the inlet arrangement (34) and outlet arrangement (35).

42. The apparatus according to claim 41, characterized in that the membrane is made from cellulose, polyamide, polytetrafluoroethylene, or polyvinylidene fluoride, or modifications, blends, mixtures, or copolymers thereof.

43. The apparatus according to claim 41, characterized in that groups acting in a substance-specific manner are immobilized on and/or in the membrane.

44. The apparatus according to claim 43, characterized in that the groups acting in a substance-specific manner are ligands for affinity separation of ligates from a liquid to be treated.

45. The apparatus according to claim 43, characterized in that the groups acting in a substance-specific manner are catalysts.

46. The apparatus according to claim 41, wherein at least one group of treatment elements (1,2) defining at least one stage (32) is arranged in the housing (35) in a direction taken by the housing (35) between the inlet arrangement (34) and outlet arrangement (38).

47. The apparatus according to claim 46, characterized in that the at least one stage (32) comprises any number of stages from 1 to 10.

48. The apparatus according to claim 41, characterized in that the at least one treatment element has a ratio $V_w/V_t$ of a volume of its walls $V_w$ to a volume $V_t$ comprising the volume of a walls $V_w$ and the volume $V_c$ of its at least one cavity between 0.4 and 0.9, where $V_w$, $V_c$, and $V_t$ refer to the wall, cavity and total volumes, respectively, of an individual treatment element.

49. The apparatus according to claim 41, characterized in that the membrane has a BET surface area between 2 and 300 $m^2$ per $cm^3$ of membrane volume.

* * * * *